United States Patent
Lavrentovich et al.

(10) Patent No.: US 9,732,277 B2
(45) Date of Patent: Aug. 15, 2017

(54) FIELD INDUCED AND CONTROLLED HELICONICAL STRUCTURE OF CHOLESTERIC LIQUID CRYSTAL

(71) Applicant: Kent State University, Kent, OH (US)

(72) Inventors: Oleg D. Lavrentovich, Kent, OH (US); Jie V. Xiang, Kent, OH (US); Sergij V. Shiyanovskii, Stow, OH (US); Corrie T. Imrie, Aberdeen (GB); Daniel A. Paterson, Aberdeen (GB); John M. Storey, Aberdeen (GB)

(73) Assignees: KENT STATE UNIVERSITY, Kent, OH (US); THE UNIVERSITY COURT OF THE UNIVERSITY OF ABERDEEN, Aberdeen (GB)

( * ) Notice: Subject to any disclaimer, the term of this patent is extended or adjusted under 35 U.S.C. 154(b) by 0 days.

(21) Appl. No.: 15/053,643

(22) Filed: Feb. 25, 2016

(65) Prior Publication Data
US 2016/0252755 A1    Sep. 1, 2016

Related U.S. Application Data

(60) Provisional application No. 62/121,575, filed on Feb. 27, 2015.

(51) Int. Cl.
*C09K 19/14* (2006.01)
*C09K 19/58* (2006.01)
(Continued)

(52) U.S. Cl.
CPC ............ *C09K 19/586* (2013.01); *C09K 19/14* (2013.01); *G02F 1/13718* (2013.01); *G02F 1/134363* (2013.01); *C09K 2019/0444* (2013.01)

(58) Field of Classification Search
CPC ....... G02B 5/18; G02F 1/292; G02F 1/13718; G02F 1/134363; G02F 2001/13478;
(Continued)

(56) References Cited

U.S. PATENT DOCUMENTS 6,074,710 A * 6/2000 Kato ................... C09K 19/36
                                                        252/299.01
2016/0033806 A1    2/2016 Lavrentovich et al.

OTHER PUBLICATIONS

Xiang, et al., "Electrically Tunable Selective Reflection of Light from Ultraviolet to Visible and Infrared by Heliconical Cholesterics,"Advanced Materials, vol. 27, pp. 3014-3018 (2015).
(Continued)

*Primary Examiner* — Chanceity Robinson
(74) *Attorney, Agent, or Firm* — Fay Sharpe LLP

(57) ABSTRACT

A liquid crystal cell includes substrates defining a gap and electrodes having one of (i) an in-plane geometry generating an electric field parallel with the substrates and (ii) a top-down geometry generating an electric field across the gap between the two spaced apart substrates. A liquid crystal material disposed in the gap between the substrates comprises a chiral nematic material formed by a mixture of: 1-(4-cyanobiphenyl-4'-yl)-6-(4-cyanobiphenyl-4'-yloxy) hexane (CB6OCB) or α,ω-bis(4,4-cyanobiphenyl)nonane (CB9CB) dimeric liquid crystal material; at least one additional dimeric liquid crystal material; and a chiral dopant. The liquid crystal material within an operational range of electric field applied by the electrodes exhibits a heliconical state with an oblique angle helicoid director whose helicoid axis is oriented parallel with the electric field and whose helicoid pitch is sized to provide diffraction or Bragg reflection of light in a spectral range of interest impinging on one of the substrates of the liquid crystal cell.

23 Claims, 16 Drawing Sheets

(51) Int. Cl.
*G02F 1/1343* (2006.01)
*G02F 1/137* (2006.01)
*C09K 19/04* (2006.01)

(58) Field of Classification Search
CPC ............ G02F 2201/305; C09K 19/586; C09K 19/0208; C09K 2019/0444; C09K 2019/122; C09K 2019/123
See application file for complete search history.

(56) References Cited

OTHER PUBLICATIONS

Chen, et al., "Chiral heliconical ground state of nanoscale pitch in a nematic liquid crystal of achiral molecular dimers," PNAS, vol. 110, No. 40, pp. 15931-15936 (2013).

Shribak, et al., "Techniques for fast and sensitive measurements of two-dimensional birefringence distributions," Applied Optics, vol. 42, No. 16, pp. 3009-3017 (2003).

Adlem, et al., "Chemically induced twist-bend nematic liquid crystals, liquid crystal dimers, and negative elastic constants," American Physical Society, Physical Review E88, pp. 022503-1-022503-8 (2013).

Balachandran, et al., "Elastic properties of bimesogenic liquid crystals," Liquid Crystals, vol. 40, No. 5, pp. 681-688 (2013).

Borshch, et al., "Nematic twist-bend phase with nanoscale modulation of molecular orientation," Nature Communications, 4:2635, pp. 1-8 (2013).

De Gennes, "Calcul De La Distorsion D'une Structure Cholesterique Par Un Champ Magnetique," Solid State Communications, vol. 6, pp. 163-165 (1968).

Xiang, et al., "Electrooptic Response of Chiral Nematic Liquid Crystals with Oblique Helicoidal Director," Physical Review Letters, PRL 112, pp. 217801-1-217801-5 (2014).

Meyer, "Effects of Electric and Magnetic Fields on the Structure of Cholesteric Liquid Crystals," Applied Physics Letters, vol. 12, No. 9, pp. 281-282 (1968).

* cited by examiner

FIELD INDUCED AND CONTROLLED HELICONICAL STRUCTURE OF CHOLESTERIC LIQUID CRYSTAL

This application claims the benefit of U.S. Provisional Application No. 62/121,575 filed Feb. 27, 2015 and titled "FIELD INDUCED HELICONICAL STRUCTURE OF CHOLESTERIC LIQUID CRYSTAL". U.S. Provisional Application No. 62/121,575 filed Feb. 27, 2015 is incorporated herein by reference in its entirety.

This invention was made with Government support under grant/contract DMR 1121288 awarded by the National Science Foundation. The Government of the United States has certain rights in this invention.

BACKGROUND

The following generally relates to liquid crystal (LC) devices and methods for applications such as, but is not limited to, LC electro-optical devices, tunable diffraction gratings, color filters, light deflectors and scatterers, wide-angle beam steerers, and the like.

A state matter called nematic liquid crystal (LC) is defined by an orientationally ordered fluid having an average orientation of nematic molecules described by a so-called director ($\hat{n}$). The best known and most widely used nematic LC material in modern LC display applications is the uniaxial nematic LC. In uniaxial nematic LCs, rod-like achiral molecules are aligned along a single straight axis which serves as the director. If some or all of these nematic molecules are chiral instead of achiral, this director will twist in space and thus follow a right-angle helix. This twisting of the director results in a structure of nematic molecules referred to as either chiral nematic (N*) or cholesteric LC state.

Chiral nematics are highly promising for active photonic applications, e.g., for use in displays, tunable lasers, energy-conserving windows, and tunable color filters. This is due, in part, to the selective reflection of N* and their self-organized right-angle helical director field. The selective reflection is a manifestation of the periodic helical organization of the cholesteric phase. When macroscopically organized in the Grandjean texture (uniform standing helix), the chiral nematic satisfies the condition for a reflection of light as defined by the Bragg Equation. For light propagating parallel to the helical axis, the central wavelength of the reflection bandgap is defined as: $\lambda_p = \bar{n}P$, where P is the pitch length of the helical twist of the director and $\bar{n}$ is the average refractive index of the liquid crystal. Assuming a constant pitch, the reflection bandwidth of N* is defined by $\Delta\lambda = \Delta nP$, where $\Delta n$ is the birefringence of the LC.

The reflection color and reflectivity of N* can be controlled by a variety of stimuli including electric field, heat, and light. The field-induced modification of the helix of the N* material is typically performed by one of two ways: (1) changing the pitch of the helix, e.g., such as in diffractive element applications, or (2) realigning the helix axis as the whole, e.g., as used in bistable displays. In both of these methods, the fundamental character of the helical twist remains intact.

However, direct application of an electric field to cholesteric LCs to control the reflected color presents many problems. Once the electric field is applied, the periodic structure of N* becomes distorted in a non-uniform manner and induces an non-uniform coloration and reflectivity. In the case of an electric field applied parallel to the helix axis, the main reason for the disruption of the N* periodic structure is out-of-plane rotation of the helix from the uniform planar state to the disordered focal conic state. Unwinding of the helix using an electric field perpendicular to the helix axis can lead to a change in the wavelength of the reflection band, but such an approach requires fringe-fields which locally distort the homogeneity of the structure. Helfrich deformation, comprising undulations of common director orientation planes parallel to the substrates, has also been shown to provide a means of change the reflection color within a narrow tuning range, in which the local tilting of helix leads to shortening of pitch under the normal incidence. However, the undulations lead to spatial inhomogeneity of the pitch causing a broadening of the reflection band and decrease in the reflectance level.

BRIEF DESCRIPTION

In some embodiments disclosed herein, an electrooptic device comprises a liquid crystal cell including spaced apart substrates defining a gap between the substrates and electrodes having one of (i) an in-plane geometry generating an electric field parallel with the substrates and (ii) a top-down geometry generating an electric field across the gap between the two spaced apart substrates. A liquid crystal material is disposed in the gap between the substrates. The liquid crystal material comprises a chiral nematic material formed by a mixture of: 1-(4-cyanobiphenyl-4'-yl)-6-(4-cyanobiphenyl-4'-yloxy)hexane (CB6OCB) dimeric liquid crystal material, at least one additional dimeric liquid crystal material other than CB6OCB, and a chiral dopant. The liquid crystal material within an operational range of electric field applied by the electrodes exhibits an $N^*_{oh}$ state with an oblique angle helicoid director whose helicoid axis is oriented parallel with the electric field and whose helicoid pitch is sized to provide diffraction or Bragg reflection of light in a spectral range of interest impinging on one of the substrates of the liquid crystal cell. In some embodiments the at least one additional dimeric liquid crystal material other than CB6OCB comprises a dimeric liquid crystal material having bend elastic constant $K_3$ that is smaller than twist constant $K_2$.

In some embodiments disclosed herein, a liquid crystal device comprises a liquid crystal (LC) cell including two substrates, a cholesteric liquid crystal material disposed within the liquid crystal cell between the substrates, and two electrodes. The electrodes are disposed on the substrates and are configured to apply an electric field through the cholesteric liquid crystal material disposed within the liquid crystal cell. The cholesteric liquid crystal material includes a mixture of at least two dimeric liquid crystal materials including at least one of: 1-(4-cyanobiphenyl-4'-yl)-6-(4-cyanobiphenyl-4'-yloxy)hexane (CB6OCB), α,ω-bis(4,4-cyanobiphenyl)nonane (CB9CB), or 1",7"-bis(4-cyanobiphenyl-4'-yl) heptane (NC(C6H4)2(CH2)7(C6H4)2CN (CB7CB). A power generator is provided for generating the applied electric field. The power generator is configured to vary the strength of the applied electric field to produce diffracted or reflected light from the cholesteric liquid crystal material within the visible spectrum, and the applied electric field induces the cholesteric liquid crystal material into a heliconical state including an oblique helicoid director. The mixture of at least two dimeric liquid crystal materials may, for example, further include CB7CB dimeric liquid crystal material. In some embodiments the cholesteric liquid crystal material includes a eutectic mixture of the at least two dimeric liquid crystal materials.

In some embodiments disclosed herein, a method of operating an electro-optic cholesteric liquid crystal device, the method comprises: providing cholesteric liquid crystal material comprising a mixture including CB6OCB or CB9CB dimeric liquid crystal material and a second dimeric liquid crystal material; applying an electric field to the cholestric liquid crystal material that is effective to induce a heliconical state in which the director forms an oblique helicoid; while applying the electric field, diffracting or reflecting light of a wavelength selected by the applied electric field from the cholesteric liquid crystal material; and adjusting the electric field to adjust the wavelength of light that is diffracted or reflected from the cholesteric liquid crystal material. In some embodiments the mixture includes a eutectic mixture of CB6OCB and CB7CB dimeric liquid crystal materials. In some embodiments the mixture includes a eutectic mixture of CB9CB and CB7CB dimeric liquid crystal materials. In some embodiments the applying, diffracting or reflecting, and adjusting operations are performed with the cholesteric liquid crystal material in the temperature range 20° C. to 30° C. inclusive.

BRIEF DESCRIPTION OF THE DRAWINGS

FIG. 4(a)-(c) are taken under a polarizing optical microscope. FIG. 4(a) represents electric-field induced unwound nematic with the director parallel to the electric field. FIG. 4(b) represents heliconical state with the director following an oblique helicoid with the axis along the electric field. FIG. 4(c) represents right-angle helicoid state of the cholesteric. All scale bars in the micrographs are 50 μm. FIG. 4(d) is a graph of the first order diffraction angle of the heliconical state as a function of the applied electric field. FIG. 4(e) is a graph of the optical phase retardance as a function of the applied electric field in the vicinity of the transition from the unwound nematic to the heliconical state.

FIG. 9(a) shows an applied field profile with 50 kHz modulated square wave, and (b) the corresponding light transmittance from the applied field profile of FIG. 9(a). FIG. 9(c) shows the turn on and FIG. 9(d) turn off-response times between base heliconical state ($C_1$) and higher field heliconical state ($C_n$).

DETAILED DESCRIPTION

Figure 1:
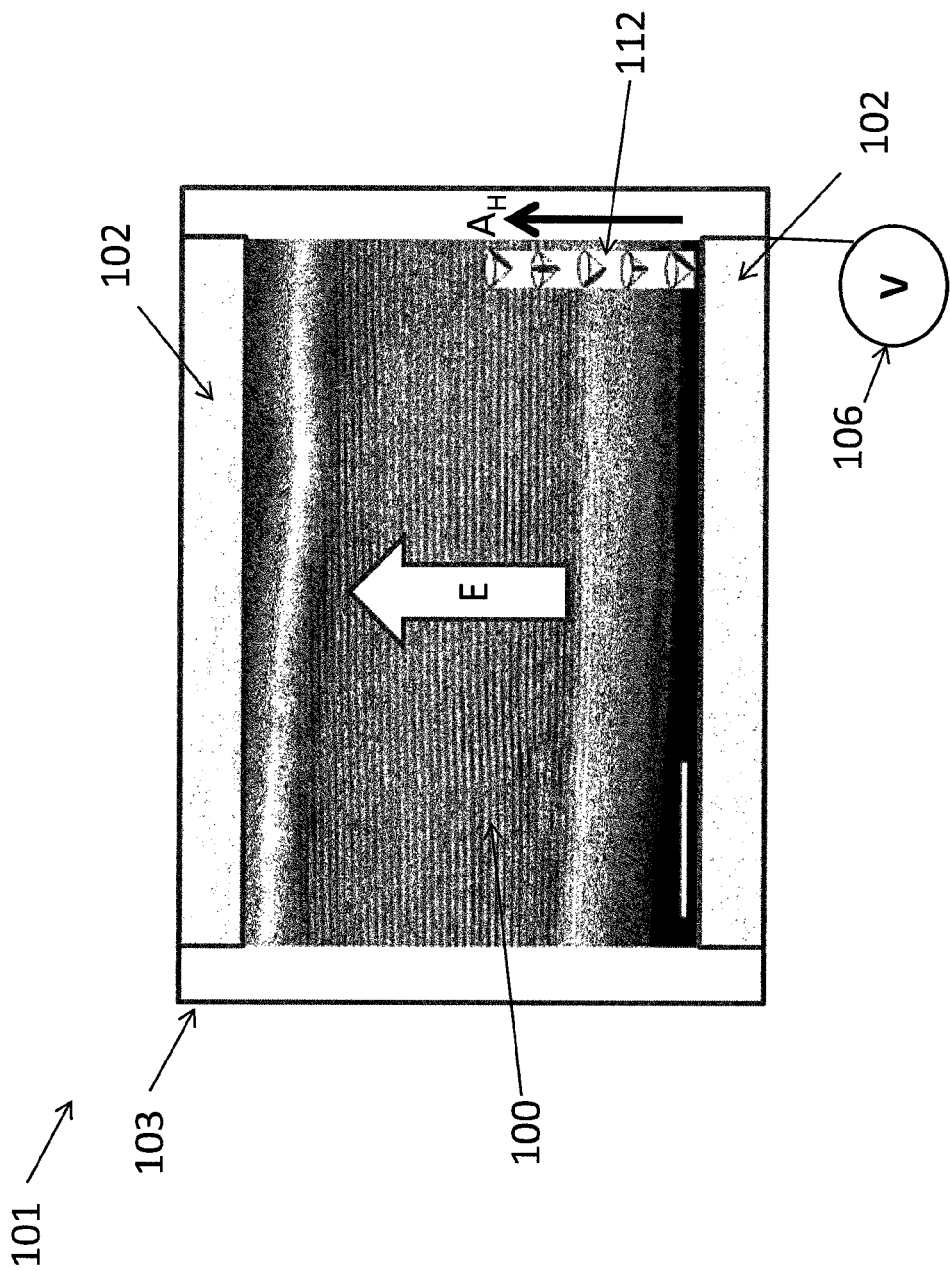
FIG. 1 is an illustration of a plan view of a device for electrically induced diffraction grating according to an exemplary embodiment.

The above noted problems can be solved by a very distinct mode of electrically induced deformation of N*. This electrically induced deformation produces a state with the director forming an oblique angle helicoid as opposed to a right angle helicoid. This state of the chiral nematic is denoted herein as $N^*_{oh}$, where the subscript "oh" derives from the "oblique helicoid" may also be referred to as the "heliconical" state.

The devices and methods disclosed herein provide electrical control of colored reflections within chiral nematic (N*) materials with an oblique helicoid director. Applications of the described approaches include, but are not limited to, diffraction grating and color tuning applications.

In various embodiments, the present disclosure provides methods and devices for electric control of chiral nematics N* with oblique angle helicoid, the state labelled as $N^*_{oh}$. As disclosed herein, the problems associated with direct coupling of the electric field and the ground state right-helicoid structure of N* can be overcome by electrically induced deformation of N* to produce a state $N^*_{oh}$ with an oblique angle helicoid director and with a pitch and cone angle that both depend on the applied electric field.

The described methods and devices generally allow for electrical tuning of the Bragg reflection from N* within the full visible spectrum with a narrow width of the reflection peak. In the ground field-free (or low field) state, the director is in the conventional chiral nematic N* state. An (increased) applied electric field directed perpendicular to the helix direction of the N* material causes a state change in which the director transforms to the $N^*_{oh}$ state to form an oblique helicoid with its helix direction oriented parallel with the applied electric field, with both the pitch and cone angle of the $N^*_{oh}$ controlled by the field. The color change is a result of the pitch change of the heliconical structure $N^*_{oh}$ with the helix axis oriented along the direction of the electric field. This electrically induced deformation approach can be applied to devices and methods to feature a broad color tunable range, a narrow reflection bandwidth and millisecond switching times. This broad range color switching of heliconical structure in chiral nematics could be used in applications such as reflection displays, color filters, and tunable LC lasers.

The $N^*_{oh}$ state has been theoretically predicted for a material in which the bend elastic constant $K_3$ is much smaller than the twist constant $K_2$. See R. B. Meyer, Applied Physics Letters 12, 281 (1968); P. G. de Gennes, Solid State Communications 6, 163 (1968); J. Xiang, S. V. Shiyanovskii, C. Imrie, and O. D. Lavrentovich, Physical Review Letters 112, 217801 (2014). This condition is not satisfied in typical nematics formed by rod-like molecules.

The devices disclosed herein operate in conjunction with N* material formed by molecular dimers in mixture with chiral dopant. Other materials formed by non-dimeric molecules, are also possible for the disclosed devices, as long as their response to the applied external electric field results in formation of the oblique helicoidal state $N^*_{oh}$. The molecular dimers, in which the flexible aliphatic chain links two rigid rod-like arms, exhibit a nematic state with an anomalously small value of $K_3$. See K. Adlem et al., Physical Review E 88, 022503 (2013); V. Borshch et al., Nature Communications 4, 2635 (2013); R. Balachandran, V. Panov, J. Vij, A. Kocot, M. Tamba, A. Kohlmeier, and G. Mehl, Liquid Crystals 40, 681 (2013). As disclosed herein, a mixture of molecular dimers with chiral dopant when subjected to appropriate electric field may transform from the conventional chiral nematic N* state with its helix axis perpendicular to the electric field to an $N^*_{oh}$ state in which the director forms an oblique helicoid with its axis oriented parallel with the applied electric field and with a helicoidal period in a useful range, e.g. suitable for performing diffraction or Bragg reflection of light in the visible, infrared, and/or ultraviolet range. This $N^*_{oh}$ material with oblique heliconical director may be used in numerous practical applications, e.g. color tuning and diffraction grating, as the pitch and cone angle of the oblique heliconical director both depend on the applied electric field. Further examples of practical application of the heliconical state with electrically controlled periodicity include (but are not limited to) smart windows with field-controlled transparency in ultraviolet, visible, and infrared parts of spectrum, electrically tunable transreflective displays that can be used as transparent informational panels; lasers with the electrically tunable wavelength of emission, when the heliconical state is doped with dyes, tunable light limiters used in laser countermeasures, tunable filters for spectroscopy, etc.

According to one embodiment, $N^*_{oh}$ material with heliconical director are used in a device 100 to implement a tunable diffraction grating. With reference to FIG. 1, a plan view is shown of liquid crystal material 100 in an LC cell 101 which includes one or more electrodes 102 employed in an in-plane geometry, that is, to produce an electric field E in the plane of the LC cell 101. In-plane means that the electrodes 102 apply an electric field E oriented in-plane with the bounding plates or substrates (such as glass plates 103) and the largest lateral surfaces of the liquid crystal (LC) slab 100 sandwiched between the glass plates 103. A voltage source or other electrical power generator 106 connected to the one or more electrodes 102 controls the strength of the electric field E applied to the LC material 100 through the one or more electrodes 102.

The LC cell 101 may be a flat glass cell with a thickness d (that is, separation between the plates 103) between 10-20 μm. (As just noted, FIG. 1 shows a plan view of the device 100; there are two plates 103 forming the flat glass cell, but only the top plate is visible in the plan view shown in FIG. 1). The electrodes 102 may be formed adjacent glass substrates 103 and be furthermore coated with a polyimide (not shown), e.g., PI2555, that sets a homeotropic (perpendicular) orientation of nematic molecules in the LC materials 100. When the cell 101 is filled with liquid crystal material 100 biased to have a helicoid director 112, an axis $A_H$ of the helicoid director 112 (see inset at lower left of the LC cell 101) is in a first plane of the cell 101. In this LC cell geometry, the periodic structure of both the heliconical director 112 achieved at a sufficiently high electric field, and the standard right-angle helical director of the cholesteric structure achieved at lower (or no) electric field, lie in the plane of the LC cell 101. To assure a uniform alignment of the helicoid director 112, the polyimide coatings on the substrates may be rubbed unidirectionally along a first axis of the first plane. The helicoid director 112 varies laterally across the cell between the electrodes 102 so as to produce a diffraction grating whose period depends upon the period of the helicoid director 112, which in turn is controlled by the electric field E (or, equivalently, by the voltage applied by voltage source 106). An electrically tunable diffraction grating is thus achieved for light impinging on the substrate 103.

Figure 2:
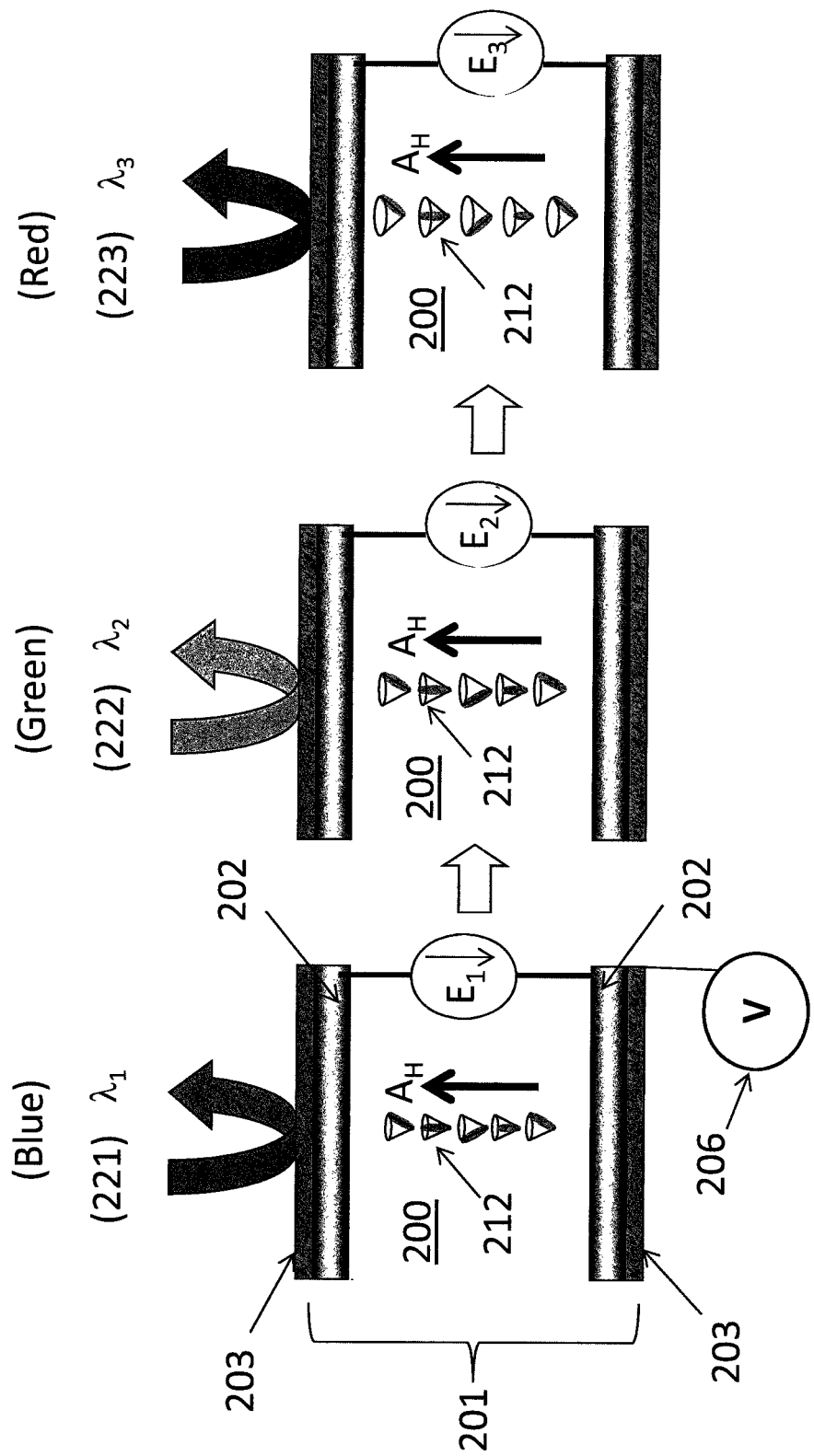
FIG. 2 is an illustration of a side sectional view of a device implementing a Bragg reflector for electrically induced color tuning according to an exemplary embodiment.

According to a second embodiment, which provides a tunable Bragg reflector, liquid crystal material with oblique heliconical director in the state $N^*_{oh}$ are used in a device 200 for electrically induced color tuning. With reference to FIG. 2, a liquid crystal material 200 is disposed in an LC cell 201 that includes one or more electrodes 202 which are employed in a top-down geometry. Top-down means that the electrodes 202 apply the electric field E across the LC cell 201 (that is, across the gap between the two spaced apart substrates 203) rather than in the plane of the device. In the left, middle, and right diagrams of FIG. 2, the electric field E applied to the liquid crystal material 200 is represented as $E_1$, $E_2$, and $E_3$, where $E_1$-$E_3$ decrease in electric strength respectively and may in one illustrative embodiment range between 3.5 V/μm and 2.8 V/μm. These voltages are in the range where the liquid crystal material 200 is in the $N^*_{oh}$ state. The minimum and maximum voltage limits of the stability of the $N^*_{oh}$ state depend on the material's chemical composition and can be tuned by a selection of appropriate compounds and dopants. The numbers above refer to only one embodiment of the invention and in no way limit the invention in terms of the voltage range. The electrodes 202 may be formed adjacent glass substrates 203 and be furthermore coated with a polyimide (not shown), e.g., PI2555, that sets a homeotropic (perpendicular) orientation of nematic molecules in the LC materials 210. When the cell 201 is filled with the LC material 200 and biased to have the illustrated helicoid director 212, the axis $A_H$ of the helicoid director 212 is oriented along the direction of the electric field E which is transverse to the substrates 203. A voltage source or other power generator 206 connected to the one or more electrodes 202 controls the strength of the electric field $E_1$, $E_2$, $E_3$ applied to the LC materials 210 through the one or more electrodes 202.

The shift of the electric field over the range $E_1$, $E_2$, $E_3$ induces a shift in the wavelength of the reflected light 221, 222, 223 within the visible spectrum by using the field-induced heliconical state of $N^*_{oh}$ with the helicoid axis $A_H$ of the director 212 parallel to the applied electric field $E_1$, $E_2$, $E_3$. The wavelength λ of reflected light is given by Bragg's law, which for normal incidence on the substrate 203 is λ=2P/n where P is the period of the helicoid director 212 and n is the effective refractive index. Adjusting the electric field strength within the range for which the LC material 200 is in the $N^*_{oh}$ state adjusts the period of the heliconical director 212 along its vertical axis, and hence tunes the reflection wavelength λ. In one embodiment, $E_1$ is approximately 3.4 V/μm and reflected light 221 appears blue in color, $E_2$ is approximately 3.1 V/μm and reflected light 222 appears green in color, and $E_3$ is approximately 2.8 V/μm and reflected light 223 appears red in color. The wavelength $\lambda_1, \lambda_2, \lambda_3$ of the reflected light 221, 221, 223 may be tuned within the full visible spectrum, e.g. approximately between 400 nm and 700 nm, with a narrow width of the reflection peak occurring around 30 nm. The response time between switching colors of the reflected light 221, 222, 223 is in the millisecond range.

In general, the disclosed electrooptic devices include LC material 100, 200 comprising chiral nematic material formed by a mixture of molecular dimers and chiral dopant, which within an operational range of applied electric field exhibit an $N^*_{oh}$ state with an oblique angle helicoid director whose helicoid axis $A_H$ is oriented parallel with the electric field and with electric field-dependent helicoid pitch and cone angle. The choice of materials is not limited by the set of molecular dimers, as any other type of chemical structure of the liquid crystal that produces the oblique helicoidal state under the action of the external field can be used in the disclosed devices. The helicoid pitch over the operational range of applied electric field is effective to provide Bragg reflection and/or optical diffraction of light in a spectral range of interest (typically the visible spectrum or a portion thereof, although operational ranges in the infrared, visible, and/or ultraviolet are contemplated. Such materials typically have bend elastic constant $K_3$ much smaller than twist constant $K_2$. The LC materials 100, 200 may include the molecular dimer 1″,7″-bis(4-cyanobiphenyl-4′-yl)heptane $(NC(C_6H_4)_2(CH_2)_7(C_6H_4)_2CN$ (CB7CB) (or like materials) doped with an amount of chiral dopant. In one embodiment, the amount of chiral dopant includes between 1 and 5 wt % of chiral (left-handed) dopant S811. As further illustrative examples, the molecular dimers may be α,ω-bis(4,4-cyanobiphenyl)nonane (CB9CB) and/or 1,11-di-(1″-cyanobiphenyl-4-yl)undecane (CB11CB), optionally mixed with monomers such as pentylcyanobiphenyle (5CB), heptylcyanobiphenyle (7CB), 4-Cyano-4-N-Pentyl-P-Terphenyl (5CT), and octulcyanobiphenyle (8CB). The chiral dopant may, for example, include one or more of the commercially available chiral dopants R811, CB15, R1011, S1011, or BDH-1281.

Figure 3:
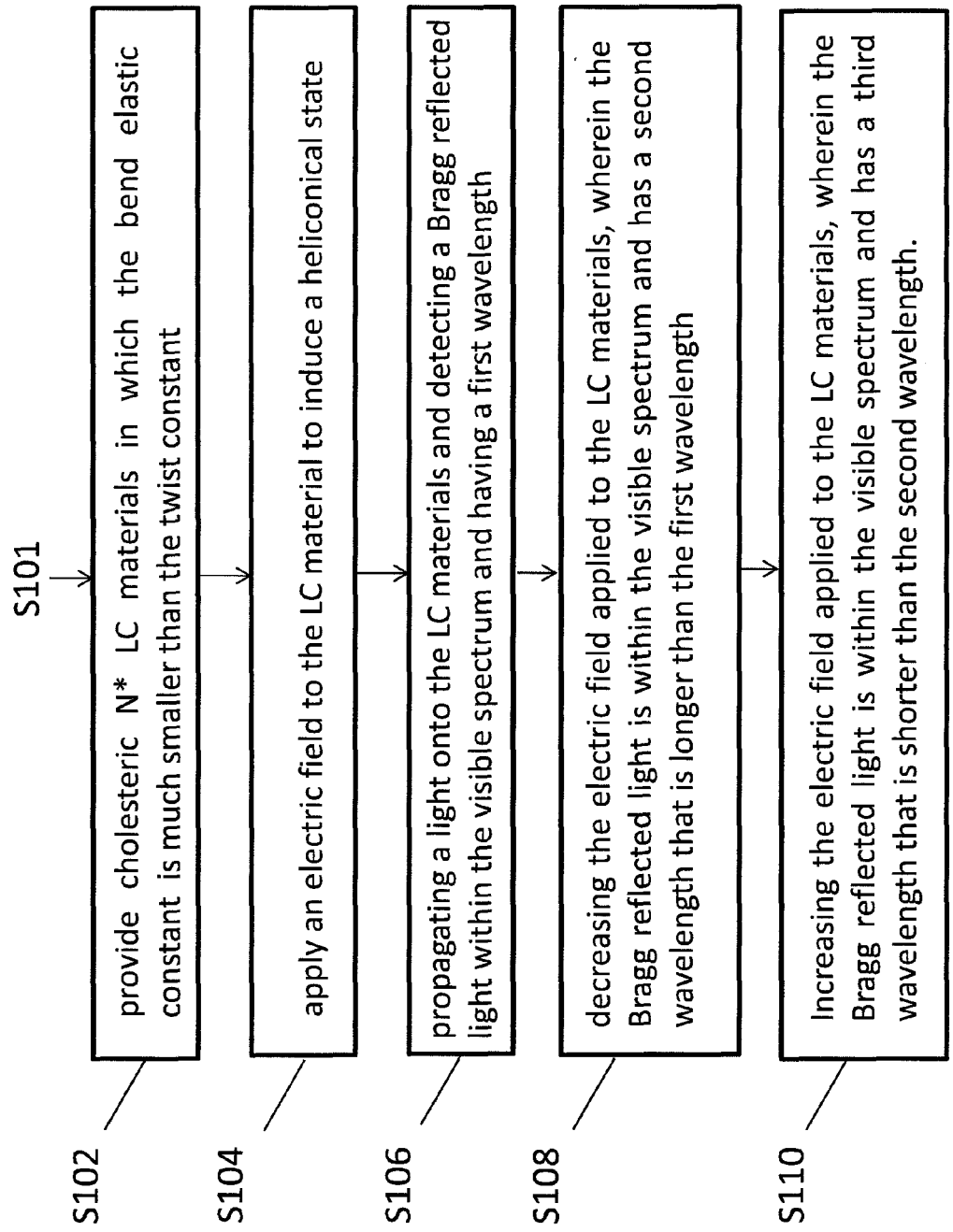
FIG. 3 is a flow diagram illustrating a method for electrically induced control of color reflections in a chiral nematic liquid crystal with oblique heliconical director.

With reference to FIG. 3, a method S100 for controlling color in the liquid crystal device of FIG. 2 starts at S101.

At S102, a liquid crystal material is provided which is chiral nematic at low (or zero) electrical bias, and in which the bend elastic constant $K_3$ is much smaller than the twist constant $K_2$.

At S104, an electric field is applied to the LC material at a field strength effective to induce a "heliconical" state in which the director forms an oblique helicoid with its axis oriented parallel with the electric field $E_{NC}$.

When the applied electric field is very high, the director of the N* is parallel to the applied electric field, n̂=(1,0,0), because dielectric anisotropy of the $N^*\in_a > 0$. Suppose now that the field is reduced, so that the tendency to twist caused by chiral nature of molecules, can compete with the dielectric torque. Below some threshold field, $$E_{NC} = \frac{2\pi}{P_0} \frac{K_2}{\sqrt{\varepsilon_0 \varepsilon_a K_3}},$$

the unwound nematic state transforms into a "heliconical" state in which the director follows an oblique helicoid, n̂=(cos θ, sin θ, cos φ, sin θ sin φ) with the conical angle θ>0 and the angle of homogeneous azimuthal rotation φ(x)=2πx/P, where the heliconical pitch P is inversely proportional to the field:

$$P = \frac{2\pi}{E} \sqrt{\frac{K_3}{\varepsilon_0 \varepsilon_a}} \qquad \text{(EQN. 1)}$$

and the conical angle θ related to the field:

$$\sin^2 \theta = \frac{\kappa}{1-\kappa} \left( \frac{E_c}{\sqrt{\kappa} E} - 1 \right) \qquad \text{(EQN. 2)}$$

where $\kappa = K_3/K_2$ and $$E_c = \frac{2\pi}{P_0} \sqrt{\frac{K_2}{\varepsilon_0 \varepsilon_a}}$$

and $P_0$ is the pitch of the N* phase, $\in_a$ is the dielectric anisotropy and $\in_0$ is the vacuum permittivity.

At S106, a light is propagated onto the LC materials and a Bragg reflected light is within the visible light spectrum and has a first wavelength.

The center wavelength for the Bragg reflection reads $$\lambda_p = \bar{n} P \qquad \text{(EQN. 3)}$$

with the reflection bandwidth $$\Delta \lambda = \Delta n_{eff} P \qquad \text{(EQN. 4)}$$

where $\bar{n} = (n_e^{eff} + n_o)/2$ and $\Delta n = n_e^{eff} - n_o$ with $$n_e^{eff} = \frac{n_e n_o}{\sqrt{n_e^2 \cos^2 \theta + n_o^2 \sin^2 \theta}}.$$

At S108, the electric field applied to the LC materials is decreased, wherein the Bragg reflected light is within the visible spectrum and has a second wavelength that is longer than the first wavelength.

At S110, the electric field applied to the LC materials is increased, wherein the Bragg reflected light is within the visible spectrum and has a third wavelength that is shorter than the second wavelength.

Further disclosure is provided in the form of the following examples. The examples provided are merely representative of the work that contributes to the teaching of the present disclosure.

Example 1: Preparing in-Plane LC Cell for Diffraction Grating Application of Cholesteric LCs with Oblique Heliconical Director An LC dimer material 1″,7″-bis(4-cyanobiphenyl-4′-yl) heptane $(NC(C_6H_4)_2(CH_2)_7(C_6H_4)_2CN$, CB7CB) was used which shows a uniaxial N phase with a positive dielectric anisotropy, sandwiched between the isotropic and the twist-bend nematic phase $N_{tb}$. See V. Borshch et al., Nature Communications 4, 2635 (2013); D. Chen et al., Proceedings of the National Academy of Sciences of the United States of America 110, 15931 (2013). The dielectric permittivities were measured parallel and perpendicular to the director $\in_\parallel$=7.3 and $\in_\perp$=5.9, respectively; the elastic constants were determined by the Frederiks transition technique to be $K_1$=5.7 pN and $K_2$=2.6 pN. See P. G. de Gennes and J. Prost, *The Physics of Liquid Crystals* (Clarendon Press, Oxford, 1993). All data corresponds to 106° C. To prepare the N* phase, CB7CB was doped with a small amount (1 wt %) of chiral (left-handed) dopant S811. The phase diagram is different from the case of an un-doped CB7CB: N* melts into an isotropic fluid at $T_{N*I}$=112° C. and transforms into a homochiral version of $N_{tb}$ at T*=99° C. The pitch $P_0$ of the N* phase, measured in the Grandjean-Cano wedge, decreases from 8.8 μm at T*+1° C. to 6.2 μm at $T_{N*I}$−1° C. The electro-optic experiments were performed at the temperature T*+3° C., at which $P_0$=(7.5±0.5) μm.

Flat glass cells of thickness d=(11-16) μm were used. The glass substrates were coated with polyimide PI2555 that sets a homeotropic (perpendicular) orientation of the molecules. When the cell is filled with N*, it shows a fingerprint texture with the helicoid axis in the plane (x,y) of the cell. This geometry allows one to clearly visualize the periodic structure of both the heliconical and cholesteric structures, as the wave-vector of director modulations in both cases is confined to the plane (x,y). To assure a uniform alignment of the helicoid, the polyimide coatings were rubbed unidirectionally along the axis x.

For the polarizing optical microscopy (POM) study, two aluminum foil electrodes were placed between the glass plates to apply the electric field parallel to the rubbing direction x. This geometry corresponds to the diffraction grating device geometry described with reference to FIG. 1. The distance between the electrodes was 140 μm. For optical diffraction and optical retardance mapping by PolScope (See M. Shribak and R. Oldenbourg, Applied Optics 42, 3009 (2003)), the cells with patterned indium tin oxide (ITO) electrodes on one of the substrates were used, and the distance between the electrodes was L=100 μm. The AC field of frequency 3 kHz was used to explore the scenarios of structural transformations of the N* cells. Because of the cell geometry and in-plane arrangement of the electrodes, the electric field is inhomogeneous, being somewhat larger near the electrodes.

To establish the spatial pattern of the electric field, COMSOL Multiphysics finite-element based solver was employed. The simulations show that in the central part of the cell, the field is uniform and horizontal in the middle of the cell. For example, for the ITO case, for the applied voltage U=100 V, the field is 0.7 V/μm with a 5% accuracy in the range −20 μm≤x≤20 μm and across the entire extension of the LC slab along the z-direction. The field acting in the center of the cell can be calculated as E=βU/L, where β is the correction coefficient, determined by numerical simulations to be 0.67 for ITO and 0.75 for aluminum electrodes.

Figure 4:
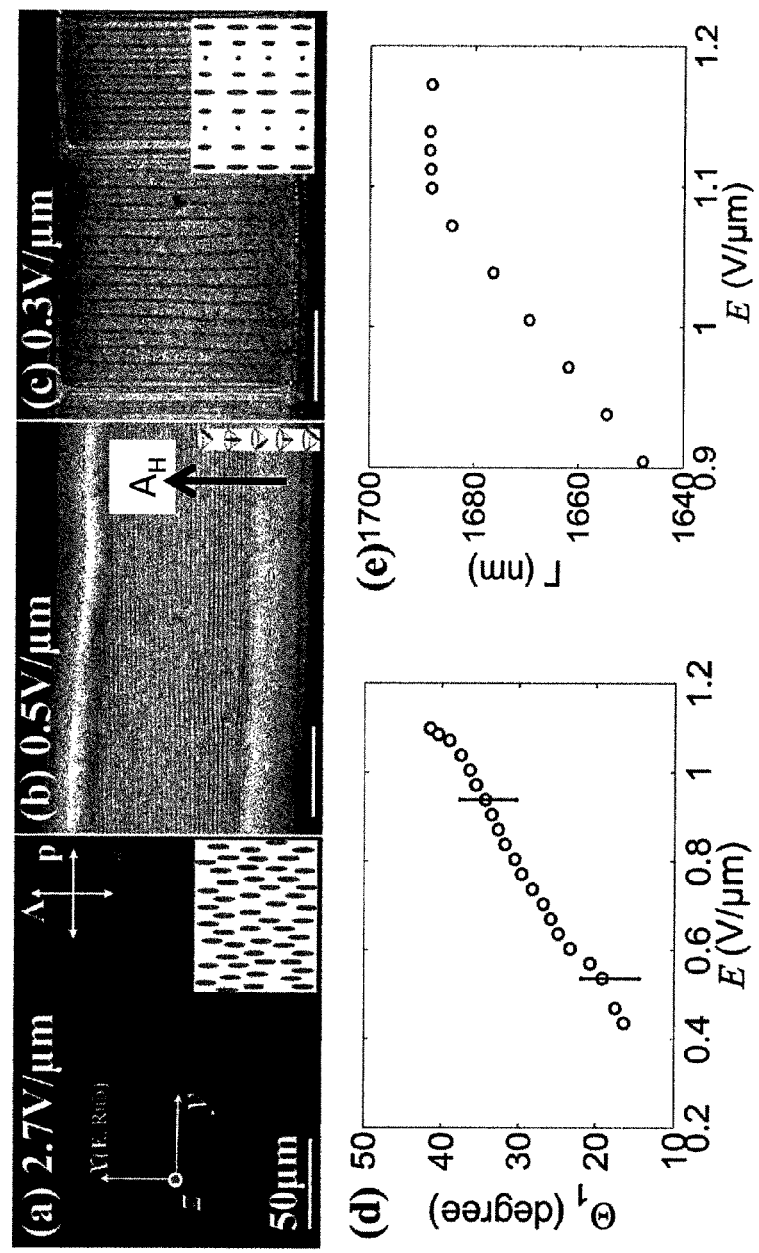
FIG. 4 is a set of micrographs and graphs showing the deformation of a chiral nematic liquid crystal in response to electric field.
Figure 5:
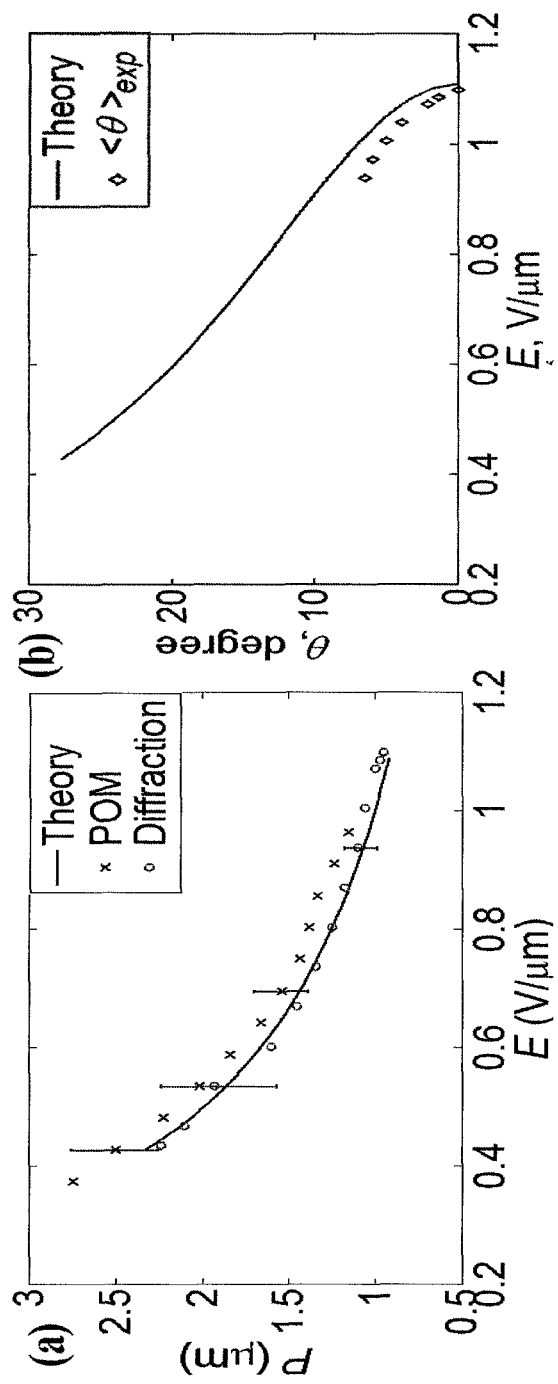
FIG. 5 is a pair of graphs showing electric field dependence of FIG. 5(a) heliconical pitch and FIG. 5(b) conical angle, as deduced from theory, Polarization Optical Microscopy (POM) experiments, and optical diffraction experiments.

FIG. 4 shows a polarizing optical microscopy (POM) experiment, where P (along the y direction) and A (along the x direction) indicate the POM polarizer and analyzer orientations (also called "crossed polarizers"). The experiment started with the application of a high electric field E applied along the x-direction, 4 V/μm, at which the helical structure of N* is completely unwound with n̂∥E (except possibly in narrow regions near the glass plates because of the homeotropic anchoring). With reference to FIG. 4(a), no periodic modulations are shown at this point. The texture is dark when viewed between two crossed polarizers, one of which (analyzer A) is parallel to E. With reference to FIG. 5(b), when the electric field is slowly decreased, the texture starts to brighten at $E_{NC}$=(1.1±0.07) V/μm, showing a periodic modulation along the x-axis. This indicates the transition to the heliconical state. With reference to FIG. 5(a), the heliconical period (shown in μm) increases with the decrease of the electric field (shown in V/μm). The effect is not transient, as for a fixed field, the structure relaxes to feature a well-defined period. Adjustment of the period to the varied electric field is achieved by nucleation and propagation of edge dislocations of Burgers vector equal to the single period of the structure. With reference to FIG. 4(c), as the field is decreased further, at some other threshold $E_{N*C}$=(0.35±0.07) V/μm, the structure changes completely, by nucleating regions with the wave-vector of periodic modulation that is perpendicular to E. The new structure is a chiral nematic state with the (right-angle) helical axis now oriented transverse to the direction of the electrical field E (along the y direction for the illustrated coordinates). The helical axis also has a much larger period of about 9 μm, which decreases as the electric field becomes smaller.

The described scenario illustrated by FIGS. 4(a-c) corresponds to the transition from the nematic (FIG. 4(a)) to oblique helicoid structure (FIG. 4(b)) at $E_{NC}$, with a subsequent oblique-to-right angle helicoid first-order transformation (FIG. 4(c)) with axis reorientation at $E_{N*C}$<$E_{NC}$. To demonstrate the oblique helicoidal state in the range $E_{N*C}$<E<$E_{NC}$, an optical diffraction method and PolScope were used.

Example 2: Optical Diffraction Method and PolScope—In-Plane LC Cell Diffraction Grating Application of Cholesteric LCs—

An optical diffraction experiment was performed with a He—Ne laser beam (λ=633 nm) directed normally to the cell. Polarization of incident light was varied by a rotating polarizer. The diffraction pattern was projected onto a screen 9.5 cm away from the sample. The heliconical state is a polarization-sensitive phase diffraction grating. For normal incidence, the diffraction condition is given by Bragg's law, mλ=P sin $\Theta_m$, where m is the diffraction order, $\Theta_m$ is the corresponding diffraction angle. For small cone angles θ, the first-order diffraction intensity ∝ $\sin^2 2\theta$ is expected to be higher than the second-order diffraction intensity ∝ $\sin^4\theta$. This is indeed the case, as the values of P calculated from the field dependence of $\Theta_1$, see FIG. 4(d), match the POM data very well, see FIG. 5(a).

With reference to FIG. 5(a), the field dependence P(E) follows closely the theoretically expected behavior P∝1/E, which allows one to extract an important information on the elastic constants of N*. See R. B. MEYER, Applied Physics Letters 12, 281 (1968). According to Eq. (2), κ=EP/$E_{NC}P_0$, which yields κ=$K_3$/$K_2$≈0.12 with the experimental data on P(E), $E_{NC}$ and $P_0$=7.5 μm. The smallness of κ satisfies the restrictions imposed by Meyer-de Gennes theory. See P. G. de Gennes and J. Prost, *The Physics of Liquid Crystals* (Clarendon Press, Oxford, 1993); R. B. MEYER, Applied Physics Letters 12, 281 (1968). Moreover, the experimental $E_{N*C}$=(0.35±0.07) V/μm agrees with the value $E_{N*C}$=0.39 V/μm obtained from Eq. (4) when κ=0.12. The twist modulus is independently calculated from the definition of $E_{NC}$ as $$K_2 = \varepsilon_0 \varepsilon_a \kappa \left(\frac{P_0 E_{NC}}{2\pi}\right)^2 = 2.6 \text{ pN},$$

the same as measured in the N phase 106° C. With the above data, one deduces a rather small value of the bend elastic constant in N*, $K_3$=0.3 pN.

PolScope was used to characterize the oblique helicoid when the cone angle θ is small. PolScope maps the optical retardance Γ(x,y) of the sample, $\Gamma = \int \Delta n_{eff} dz$, where $\Delta n_{eff}$ is the effective birefringence of the heliconical state. For a small θ, one can use an approximation $\Delta n_{eff} \approx \Delta n(1 - 3/2 \sin^2 \theta)$, where Δn is the birefringence of the unwound n̂=(1,0,0) state. As a measure of Δn, the experimentally determined birefringence of pure CB7CB was used, Δn=0.15 at 106° C. With reference to FIG. 4(e), this value yields Γ=1690 nm for the unwound state in the cell of thickness d=11.2 μm. When the field is reduced, the nematic-to-oblique helicoid transition is manifested by a cusp in the dependency Γ(E) followed by a decrease of Γ. Such a behavior is expected because of the departure of θ from its zero value at E≤$E_{NC}$ (See Eqn. (3)).

Example 3: Preparing Top-Down LC Cell for Color Tuning Application of Cholesteric LCs with Oblique Heliconical Director To demonstrate the color tuning application of heliconical structure, a doped LC dimer material CB7CB with a small amount (4.9 wt %) of chiral dopant S811 was used. The phase diagram is different from the case of an undoped CB7CB: N* melts into an isotropic fluid at 101.5° C. and transforms into a homochiral version of $N_{tb}$ at T*=90 C. The electrooptic experiments were performed at the temperature T*+3 C.

To explore the electrooptic response of N* cell, a flat glass cell of thickness d=50 μm was used. The glass substrates were coated with polyimide PI2555 that sets a homeotropic (perpendicular) orientation of the molecules. When the cell is filled with N*, it shows a fingerprint texture with the helicoid axis in the plane (x,y) of the cell. To assure a uniform alignment of the helicoid, the polyimide coatings were rubbed unidirectionally along the axis x. The AC field of frequency 3 kHz was used to explore the electrooptic properties of heliconical structure of the N* cells. The LC cell geometry corresponds to that described with reference to FIG. 2, in which the electric field is applied transverse to the planar substrates.

Due to the helicoid character of the heliconical structure, it exhibits a Bragg reflection property. The center wavelength for the Bragg reflection reads $$\lambda_p = \bar{n} P \quad \text{(EQN. 5)}$$

with the reflection bandwidth $$\Delta \lambda = \Delta n_{eff} P \quad \text{(EQN. 6)}$$

where $\bar{n} = (n_e^{eff} + n_o)/2$ and $\Delta n = n_e^{eff} - n_o$ with $$n_e^{eff} = \frac{n_e n_o}{\sqrt{n_e^2 \cos^2 \theta + n_o^2 \sin^2 \theta}}.$$

Figure 6:
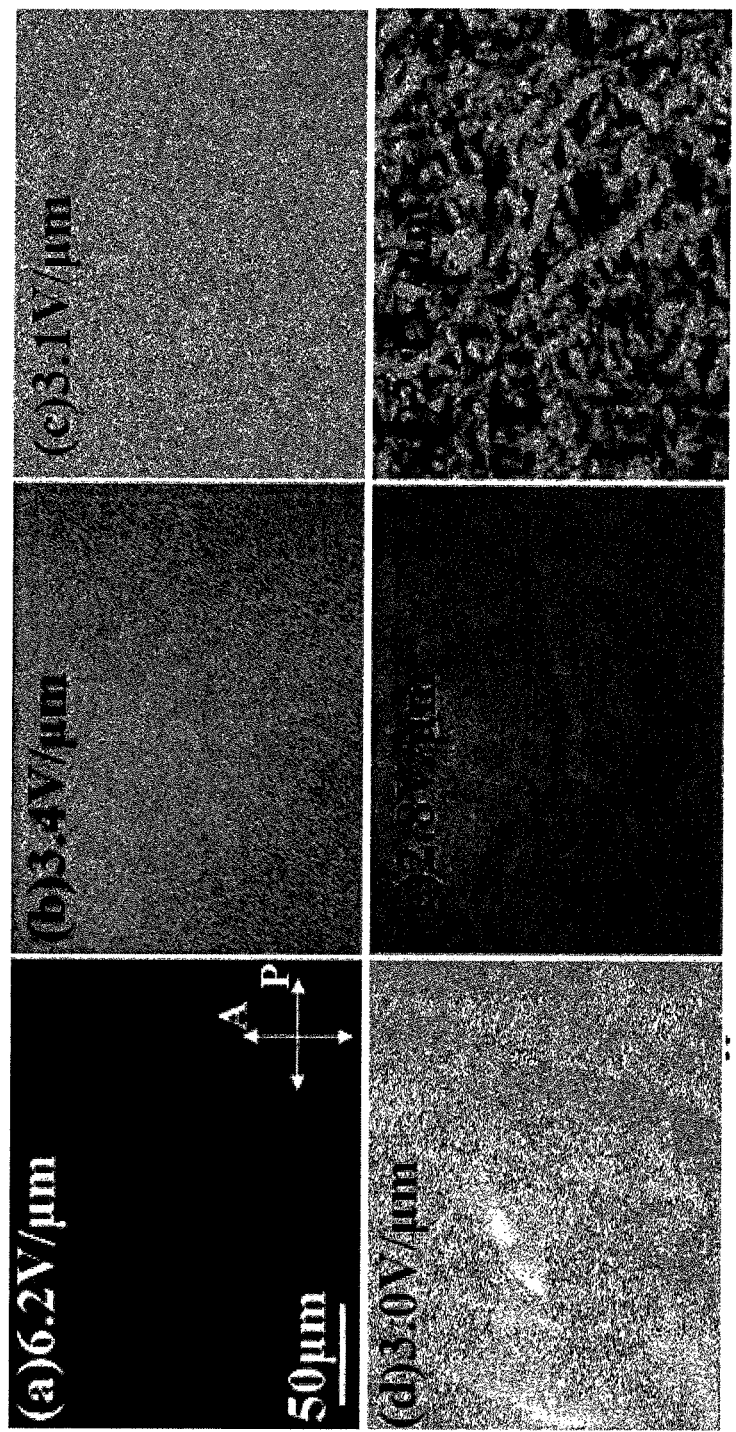
FIG. 6 is set of micrographs showing electric-field induced heliconical state with the director following predominantly an oblique helicoid with the axis along the electric field under the polarizing optical microscope. Field induced FIG. 6(a) homeotropic state, FIG. 6(b-e) heliconical state, FIG. 6(f) focal conic state. All scale bars are 50 μm.

With reference to FIG. 6, the homeotropic state is shown in FIG. 6(a). For a decrease in the field strength sufficient to transition to the heliconical state, the color of the scattered light from the cell is shifted from blue (3.4 V/μm), as shown at FIG. 6(b), to green (3.1 V/μm), as shown at FIGS. 6(c and d), and then to red (2.8 V/μm), as shown at FIG. 6(e). When the field is below 2.6 V/μm, the material is in the N* focal conic state. With reference to FIG. 6(e), the N* focal conic state is shown at 2.1 V/μm. At high field (above 6.2 V/μm), a homeotropic state is obtained (FIG. 6(a)), which appears transparent to the naked eye, and all selective reflection disappears.

Figure 7:
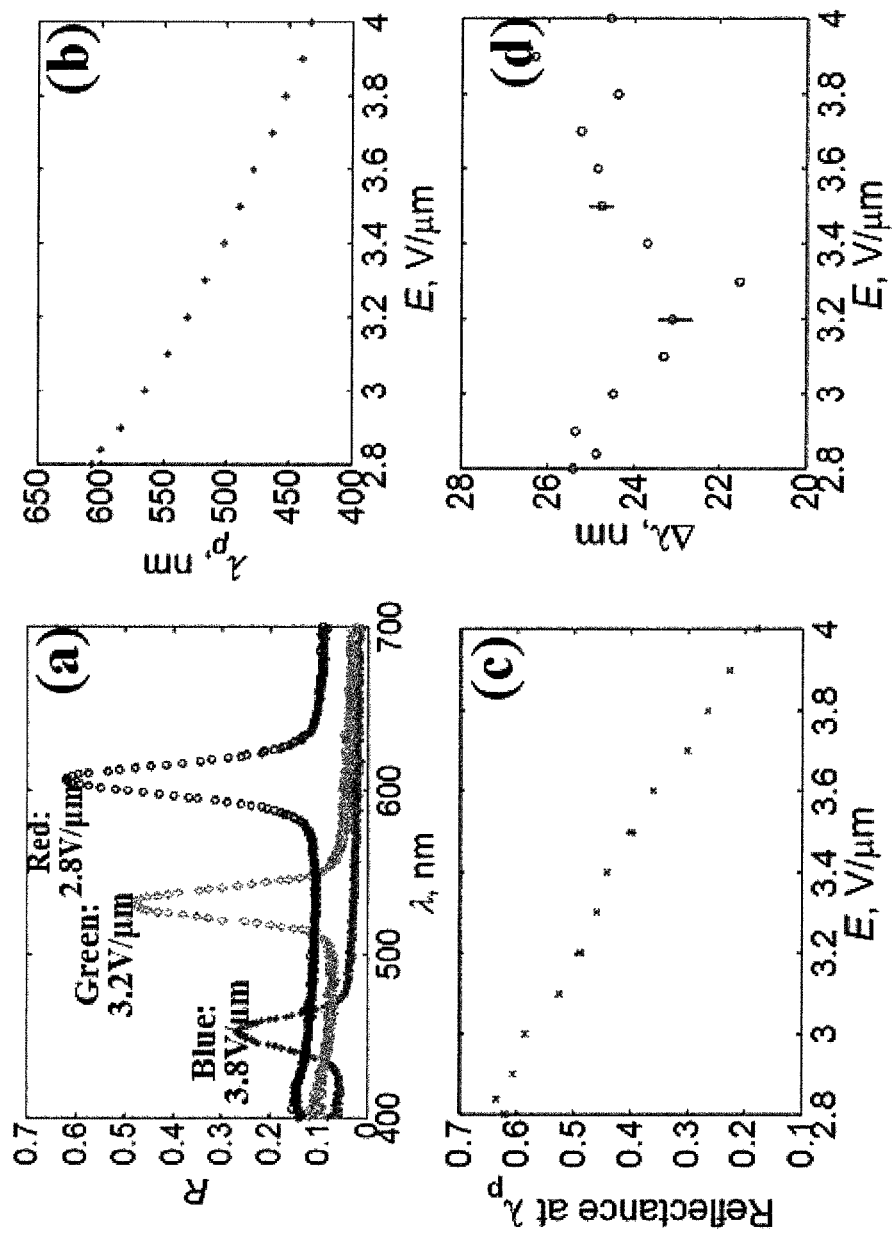
FIG. 7 is set of reflection spectrum graphs showing in FIG. 7(a) the reflection spectrum of the N* cell at different applied electric fields, in FIG. 7(b) the wavelength of the reflection peak as a function of the applied electric field, in FIG. 7(c) the reflectance of the reflection peak as a function of the applied field, and in FIG. 7(d) the bandwidth of the reflection peak as a function of the applied field.

With reference to FIG. 7, the spectral properties vary with the applied electric field strength. FIG. 7(a) shows the measured reflection spectra of the cell for three different field strengths corresponding to blue, green, and red reflected lights. These measurements were carried out with the normally incident non-polarized light. With reference to FIGS. 7(a and b), as the field strength continues to decrease, the peak wavelength shifts to the red region of the visible spectrum. This is mainly because the pitch of the heliconical structure increases with the decrease of the electric field per EQN. (1). As θ increases with decreasing the field, per EQN. (2), $n_e^{eff}$ becomes bigger while $n_o$ remains the same. Therefore the effective birefringence $\Delta n_{eff} = n_e^{eff} - n_o$ increases as decreasing the electric field. With reference to FIG. 7(c), this results in the peak reflectance increasing with a decrease in the applied electric field. The peak reflectance can be further increased by using a thick cell. The reflection band almost unchanged when changing the field, FIG. 7(d), which can be explained by the non-ideal helix due to the boundary conditions, pitch variation and helix tilting due to the edge dislocations in the bulk. See L. M. Blinov, Electro-optical and magneto-optical properties of liquid crystals (Wiley, 1983).

Figure 8:
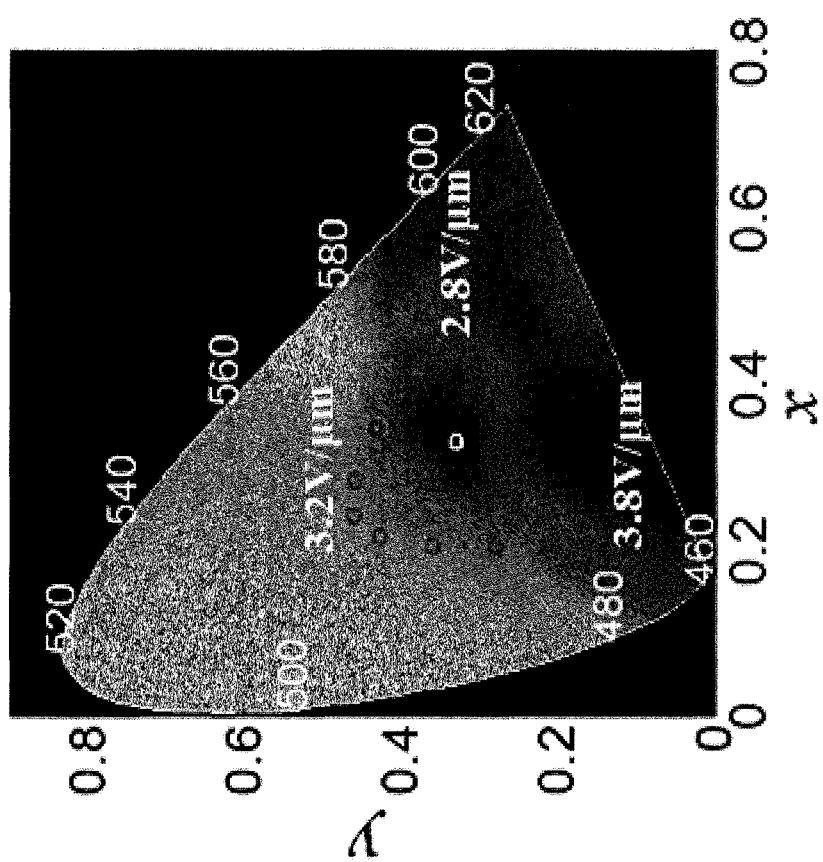
FIG. 8 is a CIE1931 chromaticity diagram 2° viewing angle of reflection wavelength of electrically switchable heliconical structure in cholesteric liquid crystals. Blue circles show the color coordinates of the reflected color under different electric fields, and the white open circle corresponds to the white chromaticity.

Example 4: Chromaticity Diagram—Top-Down LC Cell for Color Tuning Application of Cholesteric LCs with Oblique Heliconical Director The chromatic sensation of human eyes to a specific optical spectrum is usually characterized by a chromaticity diagram. In what follows, we use the CIE1931 2° basis with D65 illuminant to characterized the colorimeters of the heliconical structure of N* samples. Each circle corresponds to the reflection color obtained from heliconical structure under the applied electric field. With reference to FIG. 8, the electrically switchable colors follow a clockwise fashion with the increase in applied field.

Example 5: Response Time Measurement—Top-Down LC Cell for Color Tuning Application of Cholesteric LCs with Oblique Heliconical Director With reference to FIG. 9, the characteristic times of color tuning were determined by recording the change of light transmittance through the cell and determining the levels of 10% and 90% of the maximum transmittance. In order to obtain the response time between two heliconical states, a drive scheme has been conceived as depicted in FIG. 9(a).

Figure 9:
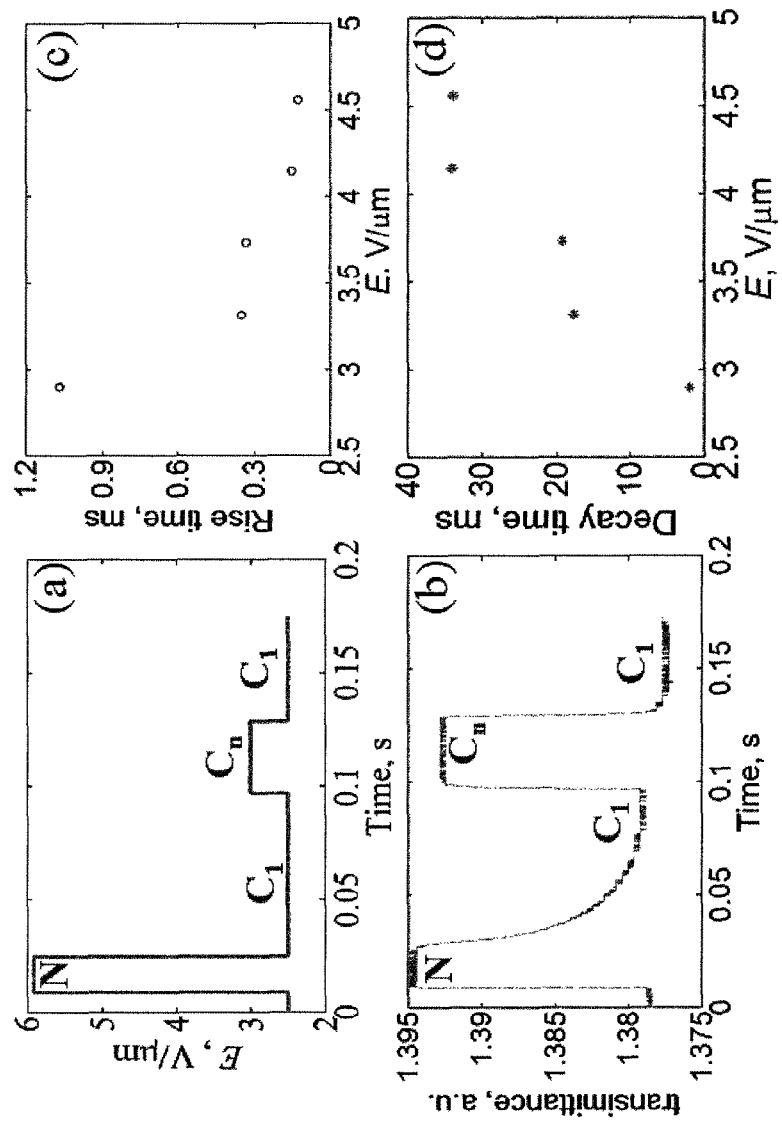
FIG. 9 is a set of graphs representing the electro-optic response of heliconical states.

With reference to FIG. 9(a), all electric fields are RMS value with square wave form of frequency 50 kHz. A high field (5.9 V/μm) was first applied to achieve the nematic state (N). This field was then reduced to a low value (2.5 V/μm) to have a base heliconical state ($C_1$). The field was then increased (2.5V/μm<E<5V/μm) to have another heliconical state ($C_n$). The field was then reduced to a low value again to return to the base heliconical state ($C_1$). Using this scheme, the response time between two heliconical states can be measured. With reference to FIGS. 9(c and d), the switch on $\tau_{on}$ times are in the submillisecond range and switch off $\tau_{off}$ times are in the millisecond range. Higher fields are shown for the higher field heliconical state, smaller switch-on time, and also larger switch-off time.

Example 6: Field-Induced Heliconical Structure Employing a Liquid Crystal Mixture with Broad Temperature and Spectral Ranges of Operation The foregoing examples employ chiral-doped CB7CB liquid crystal dimer material as the active layer that exhibits the heliconical state. The chiral-doped CB7CB exhibits the heliconical state at temperatures in excess of 90° C., which is too high for use as a room-temperature device.

In this example, a cholesteric mixture is employed, which exhibits a broad temperature range of stability that embraces the room temperature, and which has a small bend elastic constant $K_3$ which is smaller than the twist constant $K_2$, which as mentioned previously correlates with achievability of the oblique helicoidal state. Using such mixtures, it was demonstrated that selective reflection of light can be obtained, I with the selection wavelength tunable within a wide spectral range from ultraviolet (UV) to near infrared (near IR), by a low driving electric fields, a few V/μm.

The approach exemplified by this example leverages the observation that a mixture of two materials can sometimes exhibit a lower melting temperature than either material individually. Here and in what follows, the melting temperature is defined as a temperature above which the material exhibits the heliconical state. Below that temperature, it might be in any other state, say, crystalline, nematic twist-bend phase, smectic state, columnar phase, amorphous state, etc. Some such materials exhibit a so-called "eutectic composition" at which the mixture exhibits a minimum melting temperature (as a function of mixture composition). This minimum melting temperature is referred to as the "eutectic temperature". The "eutectic point" is the location on the phase diagram of the mixture defined by the eutectic composition and eutectic temperature. Although the eutectic composition provides the minimum melting temperature, there is generally a range of mixture compositions for which the mixture has a lower melting temperature than either individual constituent. The approach exemplified by this example is premised on the hypothesis that a eutectic mixture (or a mixture close to the eutectic composition having a depressed melting temperature) may exhibit the chiral nematic (N*) state at a lower temperature than either one of the two constituent materials.

The illustrative mixture was formulated by mixing two dimeric liquid crystal materials: (1',7'-bis(4-cyanobiphenyl-4'-yl)heptane (CB7CB) and 1-(4-cyanobiphenyl-4'-yl)-6-(4-cyanobiphenyl-4'-yloxy)hexane (CB6OCB)), along with the liquid crystal material pentylcyanobiphenyle (5CB) (Merck). The mixture was doped with a left handed chiral additive S811 (Merck) that determines the pitch $P_0$. Three tested mixture compositions, designated $M_1$, $M_2$, and $M_3$, are summarized in the table below.

| CB7CB:CB6OCB:5CB:S811 Mixtures Tested | | |
|---|---|---|
| Composition designation | Composition ratio (in weight units) CB7CB:CB6OCB:5CB:S811 | Temperature range of cholesteric phase |
| $M_1$ | 30:20:46:4 | 20° C.-66.5° C. |
| $M_2$ | 30.1:20:45.9:4 | 22° C.-68° C. |
| $M_3$ | 29:20:49:2 | 21° C.-69.5° C. |

All three mixtures $M_1$, $M_2$, and $M_3$ demonstrated electrically tunable light reflection in the cholesteric phase at temperatures up to 45° C.; at higher temperatures, the effect disappears as $K_3$ in dimeric materials increases with temperature. All data reported herein for the mixtures $M_1$, $M_2$, and $M_3$ were obtained at 25° C. In the experiments, the cholesteric material was sandwiched between two glass plates with transparent indium tin oxide (ITO) electrodes for applying the electrical bias.

A second illustrative mixture was formulated by mixing two dimeric liquid crystal materials: (1',7'-bis(4-cyanobiphenyl-4'-yl)heptane (CB7CB) and ω-bis(4,4-cyanobiphenyl)nonane (CB9CB)), along with the liquid crystal material pentylcyanobiphenyle (5CB) (Merck). The mixture was doped with a right handed chiral additive CB15 (Merck) that determines the pitch $P_0$. The mixture composition is CB7CB:CB6OCB:5CB:CB15 (in weight units) being 30:20:44:6. The mixture produces heliconical state in the temperature range 23-50° C.

Figure 10:
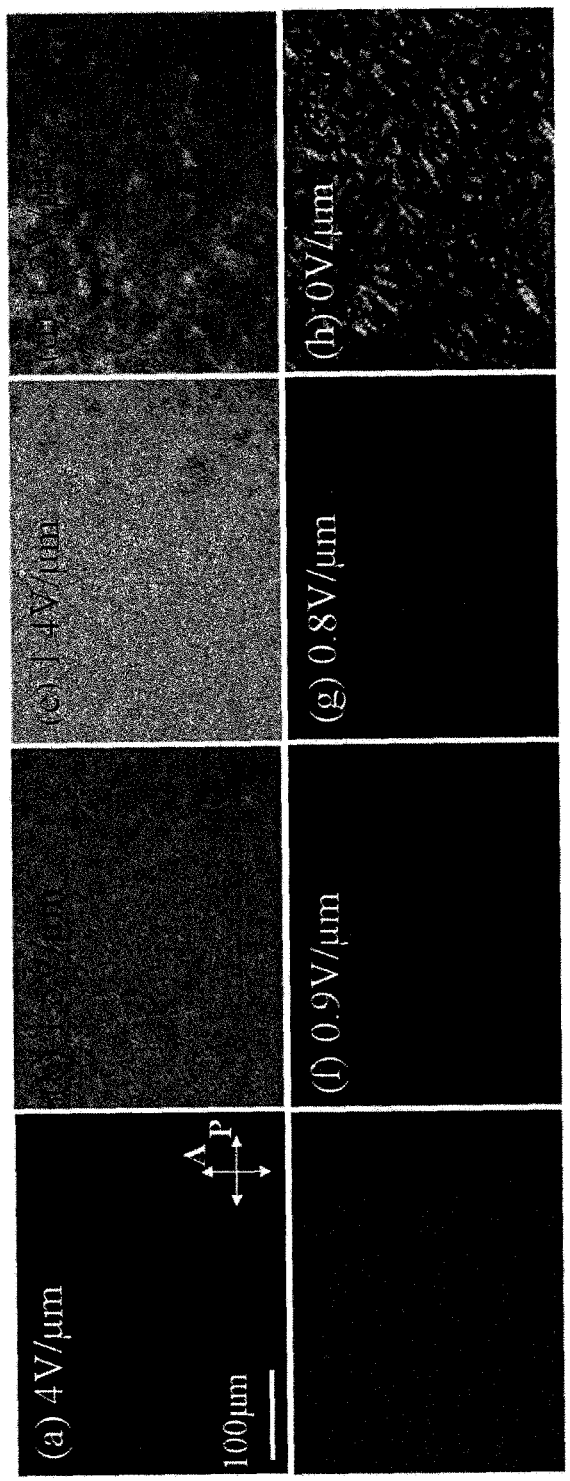
FIG. 10 shows polarizing optical microscope texture images of a liquid crystal cell including a mixture of two dimeric liquid materials.

With reference to FIG. 10, polarizing optical microscope texture images (a)-(h) are presented. Microscope image (a) shows the field-induced unwound nematic state obtained at an applied electric field of 4 V/μm. Image (b) shows a heliconical state with reflected light of blue color obtained at 1.5 V/μm. Image (c) shows a heliconical state with reflected light of green color obtained at 1.4 V/μm. Image (d) shows a heliconical state with reflected light of orange color obtained at 1.2 V/μm. Image (e) shows a heliconical state with reflected light of red color obtained at 1.1 V/μm. Images (f) and (g) show two IR-reflective states obtained at 0.9 V/μm and 0.8 V/μm, respectively. Image (h) shows the fingerprint state at zero bias. The electric field values are root-mean-square (RMS) amplitude values, and are also indicated in FIG. 10 on each microscope image (a)-(h).

As seen in FIG. 10, image (a), when a sufficiently strong electric field was applied, the material was switched into a uniform nematic phase with the director oriented parallel to the applied electric field. Such a state is dark when viewed between crossed linear polarizers. When the applied electric field was decreased, the liquid crystal passed through a sequence of changing reflection wavelengths, from UV to visible blue (image (b)), green (image (c)), orange (image (d)), red (image (e)), and, finally, near IR (images (f) and (g)). For an applied electric field below 0.7 V/μm, the liquid crystal material transformed into the light scattering (fingerprint) texture shown in FIG. 10, image (h).

Figure 11:
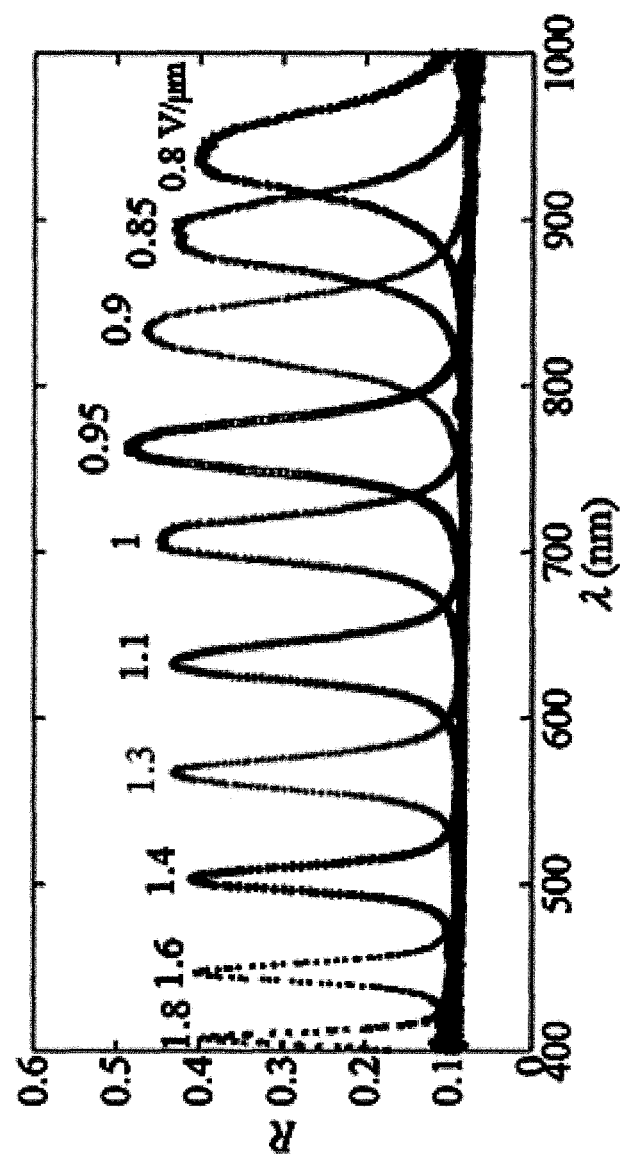
FIGS. 11 and 12 present reflection spectra, peak wavelength and bandwidth of reflection at various field strengths for devices as described herein.
Figure 12:
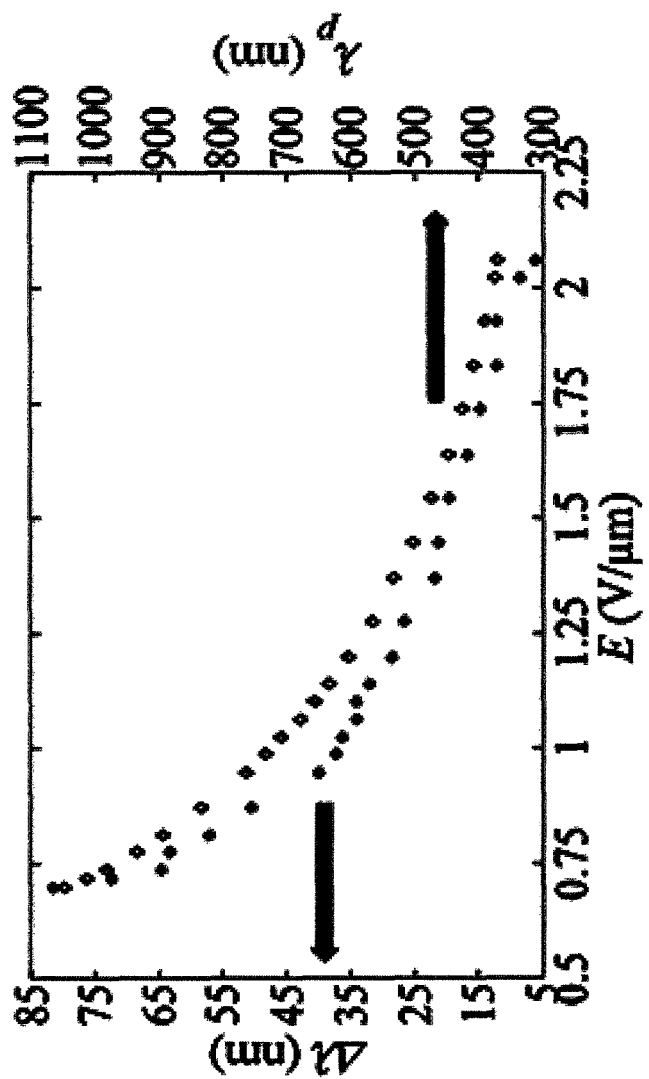

With reference to FIGS. 11 and 12, reflection spectra, peak wavelength and bandwidth of reflection are presented at various field strengths, which further demonstrate a broad range of controlled reflectance from UV to IR, covering the entire range of visible light. FIG. 11 presents typical reflection spectra of the $M_1$ cell for different amplitudes of the applied electric field, with each spectrum labeled above its peak with the applied field in V/μm units. FIG. 12 plots electric field dependencies of the peak wavelength ($\lambda_p$, right-hand coordinate) and bandwidth ($\Delta\lambda$, left-hand coordinate) of the selective reflection peak. As the applied electric field decreases, the peak wavelength shifts toward the IR, as seen in FIGS. 11 and 12. The reflection coefficient R was measured to be 41% for the reflection peak at 632 nm (field 1.1 V/μm). The bandwidth $\Delta\lambda$ narrows with increasing applied electric field, as seen in FIG. 12. By controlling the chemical composition of the mixture, one can optimize the reflection efficiency for any given pitch, and adjust the bandwidth that narrows down at higher electric field.

Figure 13:
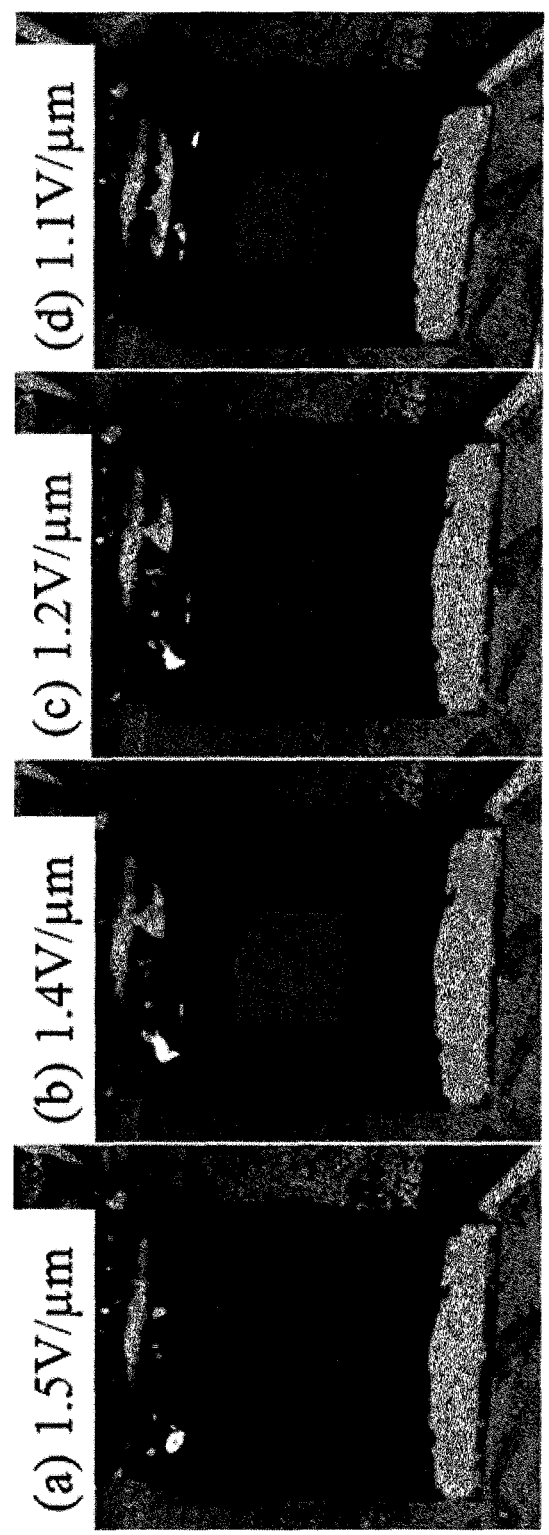
FIG. 13 presents photographs of devices as described herein.

With reference to FIG. 13, the effect of electrically tuned color reflection is apparent not only under a microscope (FIG. 10) and in spectral measurements (FIGS. 11 and 12), but also with naked eye observation without any polarizers, and at ambient light conditions. FIG. 13 shows photographs of a reflective display (area 5 mm×5 mm, thickness 50±2 µm) controlled by an applied AC electric field. By changing the applied AC electric field, the reflected color is visually observed to change between blue (FIG. 13 photograph (a)), to green (photograph (b)), to yellow (photograph (c)), to red (photograph (d)). The RMS amplitude of the applied electric field is superimposed on the photographs of FIG. 13. The results of FIG. 13 demonstrate suitability of devices operating in the heliconical state at room temperature for reflective informational displays. The color changes in any sequence from deep blue, to green, yellow, and red, are observed with a naked eye without any polarizers under ambient room light conditions. Moreover, these results are obtained at room temperature using the by using the CB7CB:CB6OCB mixture.

Figure 14:
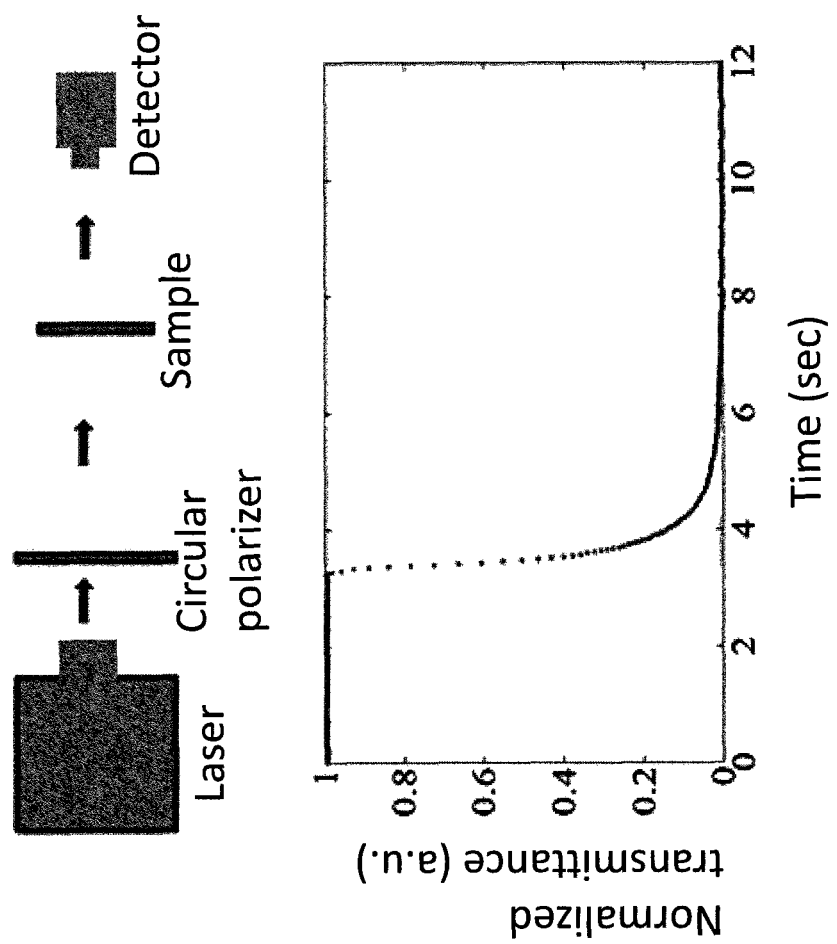
FIG. 14 presents electro-optic response time data for devices as described herein.

With reference to FIG. 14, electro-optic response time of cholesteric structures is described. The top diagram of FIG. 14 presents a schematic illustration of the experiment setup. The lower plot of FIG. 14 shows the transient process when the sample switched from a homeotropic state to a heliconical state with red reflection colour ($\lambda_p$=632 nm). In this experiment, the characteristic times of electrooptic response were determined by recoding the transmittance change of the circularly polarized light through the cell and determining the levels of 10% and 90% of the maximum transmittance. The switching time was found to be 0.8 second for switching from the homeotropic state (applied electric field E=5 V/µm) to the oblique helicoidal state with reflective red colour (E=1.1 V/µm). Real-time video was recorded of the reflection spectra of an $M_1$ cell changing in response to the applied electric field that was continuously varied from 2 V/µm to 0.7 V/µm within 19 sec. The video showed that the range 400 nm-890 nm of the reflection peak wavelength was swept within about 19 seconds, with an average rate of 26 nm/s.

In some devices, it is desired to block visible and near-IR light selectively and independently, by varying the applied voltage. Such a task can be performed by multilayered stacks of oblique helicoidal cholesterics with different concentration of chiral additive, since the materials are not absorbing.

Figure 15:
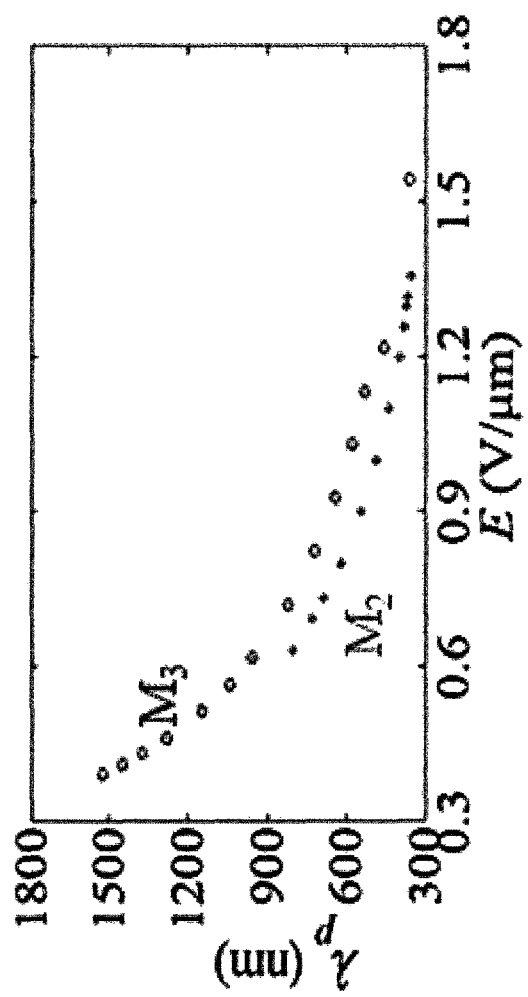
FIGS. 15 and 16 present data for a device stack described herein providing selective and independent blockage of visible and near infrared light.
Figure 16:
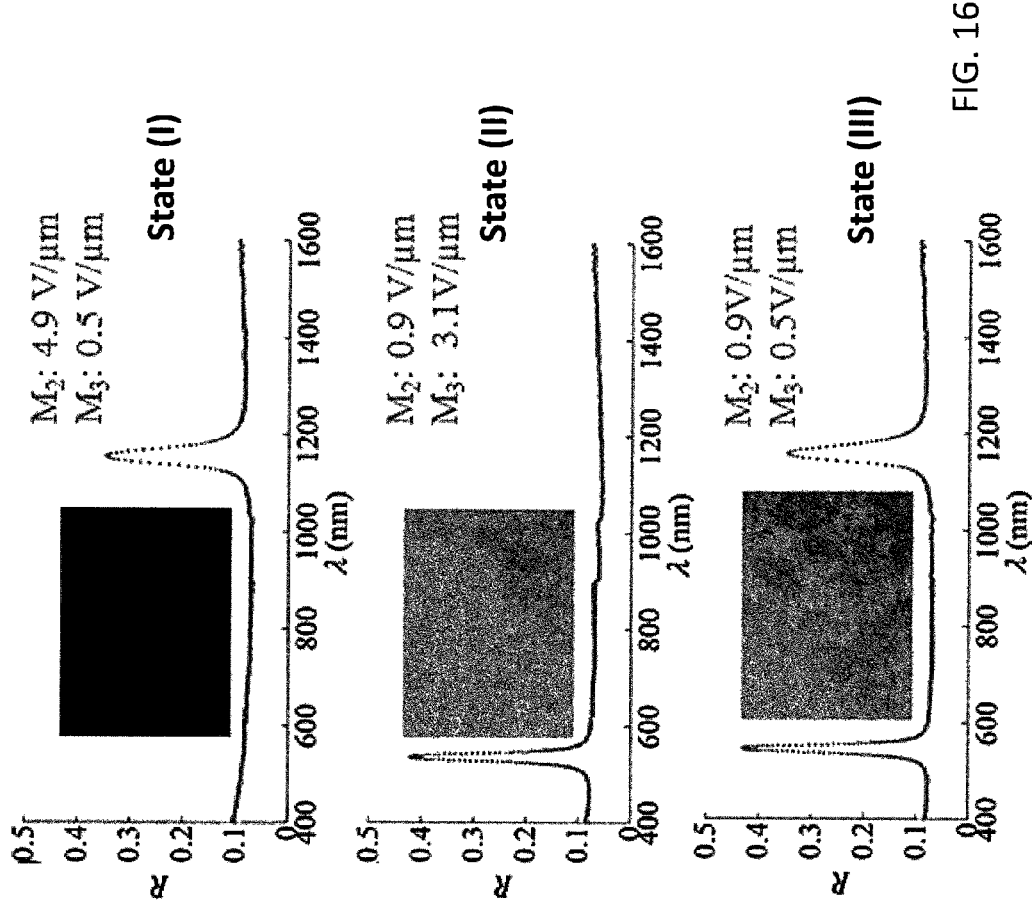

With reference to FIGS. 15 and 16, to demonstrate this approach, a stack of cells was tested including a short-pitch $M_2$ cell and a long-pitch $M_3$ cell stacked on top of each other. FIG. 15 plot reflection wavelength versus applied electric field for the individual $M_2$ and $M_3$ cells of the stack. The spectral tuning range is seen to be wide, namely 360-1520 nm for the $M_3$ cell and 360-800 nm, for the $M_2$ cell. As shown in FIG. 16, depending on the electric fields applied to the $M_2$ and $M_3$ cells, the stack produces a variety of states. The top plot of FIG. 16 shows a State (I) which is transparent in the visible region and reflecting in IR. This is obtained by applying a stronger voltage (4.9 V/µm) to the $M_2$ cell as compared to the $M_3$ cell (0.5 V/µm). The middle plot of FIG. 16 shows a State (II) which is transparent in the IR and reflecting in the visible, obtained by applying a stronger voltage to $M_3$ cell (3.1 V/µm) compared with the $M_2$ cell (0.9 V/µm). The lower plot of FIG. 16 shows a State (III) which is reflecting in both the visible and IR, obtained by applying moderate voltages to both the $M_2$ cell (0.9 V/µm) and the $M_3$ cell (0.5 V/µm). In each of the plots of FIG. 16, inset textures images are shown, which were taken under a reflective optical microscope with crossed polarizers. Not shown in FIG. 16 is a State (IV) which is transparent in both the visible and IR, obtained by applying high voltages to both the $M_2$ and $M_3$ cells. Advantageously, the applied electric field not only switches the two reflection bands on and off (as in standard cholesterics), but also tunes their spectral position, as shown in FIG. 15. Using techniques developed previously for standard cholesterics, one can broaden the reflected bands by polymerization of the material (See V. T. Tondiglia, et al., Journal of Applied Physics 110, 053109 (2011), or increase the reflectivity to 100% by using optical compensators (See D. M. Makow and C. L. Sanders, Nature 276, 48-50 (1978)).

Experimental results on the field dependence of $\lambda_p$ (see FIG. 12) support a theoretical model in which $P \propto 1/E$. For full description of the dependency $\lambda_p(E)$ one also needs to take into account a somewhat weaker field dependency of the refractive indices. For light propagating along the axis, the effective birefringence depends on the tilt angle θ:

$$\Delta n_{eff} = \frac{n_e n_o}{\sqrt{n_e^2 \cos^2\theta + n_o^2 \sin^2\theta}} - n_o.$$

It has been shown that the tilt angle θ decreases as the electric field increases, so that $\Delta n_{eff}$ becomes smaller. This is why, for a given material, the reflectivity is typically weaker at high fields; it is also weaker at low fields, as the number of cholesteric layers in the cell of a fixed thickness decreases as the pitch increases, as seen in FIG. 11.

When the light beam is not strictly perpendicular to the cell, the oblique helicoid produces reflection not only at $\lambda_p$, but also at $2\lambda_p$ since the molecules separated by P/2 are tilted in opposite directions. In the presented experiments with normally incident beams of small divergence, the peak at $2\lambda_p$, although observable, was about 10 times weaker than the main peak at $\lambda_p$.

To change the color, the pitch adjusts to the electric field, either through slippage at the bounding plates or through nucleation and propagation of dislocations. Indeed, some of these defect lines are observable in FIG. 10, images (b)-(e). An advantage of the heliconical cholesteric over structures in smectics is absence of positional order in molecular packing, which allows the system to adapt easily and reversibly to the changes of period—as a consequence, all color changes observed in the experiments reported herein were reversible and relatively fast. For example, the homeotropic state (at 5V/µm) switches into the heliconical state with saturated (90% of the maximum reflection) reflective red colour (1.1V/µm) within 0.8 second; the time was measured by monitoring the transmission intensity of the He—Ne laser beam. The video shows that the range (400-890) nm is swept within about 19 seconds, with an average rate 26 nm/s; the reflection coefficient increases from about 20% at 400 nm to 28% at 633 nm and then reduces to about 20% at 890 nm. Transition from the scattering state that exists at zero field, to the heliconical state with saturated (90% of the maximum reflection) red color reflection (1.1V/µm) takes much longer time, about 120 seconds. The reason is that this transformation involves motion of multiple linear defects that is strongly hindered in chiral structures, especially glide, as discussed for the case of standard cholesterics. The transition from the scattering state (zero field) to homeotropic state (5V/µm) is faster, 60 milli-seconds, since the applied field is strong; thus the preferred mode of switching might be between the homeotropic states and color-reflecting states.

The results for the CB7CB:CB6OCB mixture-based material exhibit an electrically tunable selective reflection of light in UV, visible and IR by the heliconical cholesteric state that exists in a broad temperature range including room temperature. The tunable structural color was achieved in a simple sandwich geometry, in which the cholesteric was confined between two plates with transparent electrodes, thus implying a low cost and easy fabrication process. The color change occurred over the entire electrode area that can be designed as a desired pattern suitable, for example, for "see-through" color displays. The electrically tunable colors can be additionally controlled by the cholesteric composition of the CB7CB:CB6OCB mixture and by employing reflective stacks. The effect can be tuned to practically any spectral regions in UV, visible and IR by chiral additives of different twisting power or concentrations.

The illustrative example employs a mixture of CB7CB and CB6OCB dimeric liquid crystal materials near the eutectic composition. More generally, it is expected that mixtures of other dimeric liquid crystal materials that individually exhibit the heliconical state may be employed, with the impact of the mixture typically being to reduce the melting point and thereby enable lower-temperature heliconical operation. The advantage of low temperature operation is expected to be greatest for the mixture at or near the eutectic point. The experimental results provide a reasonable expectation that such devices will operate in the heliconical state at room temperature, e.g. at 25° C. as tested, or in a typical room temperature range such as 20° C. to 30° C. inclusive. Moreover, it is contemplated for the mixture to include more than two dimeric liquid crystal materials, with the three- or more-component mixture preferably being at or near the eutectic point for the three- or more-component mixture.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. An electrooptic device comprising:
   a liquid crystal cell including spaced apart substrates defining a gap between the substrates and electrodes having one of (i) an in-plane geometry generating an electric field parallel with the substrates and (ii) a top-down geometry generating an electric field across the gap between the two spaced apart substrates;
   a liquid crystal material disposed in the gap between the substrates and comprising a chiral nematic material formed by a mixture of:
      1-(4-cyanobiphenyl-4'-yl)-6-(4-cyanobiphenyl-4'-yloxy)hexane (CB6OCB) dimeric liquid crystal material,
      at least one additional dimeric liquid crystal material other than CB6OCB, and
      a chiral dopant;
   wherein the liquid crystal material within an operational range of electric field applied by the electrodes exhibits an $N^*_{oh}$ state with an oblique angle helicoid director whose helicoid axis is oriented parallel with the electric field and whose helicoid pitch is sized to provide diffraction or Bragg reflection of light in a spectral range of interest impinging on one of the substrates of the liquid crystal cell.

2. The electrooptic device of claim 1 wherein the at least one additional dimeric liquid crystal material other than CB6OCB comprises:
   1",7"-bis(4-cyanobiphenyl-4'-yl)heptane (NC(C6H4)2(CH2)7(C6H4)2CN (CB7CB) dimeric liquid crystal material.

3. The electrooptic device of claim 1 wherein the at least one additional dimeric liquid crystal material other than CB6OCB comprises a dimeric liquid crystal material having bend elastic constant $K_3$ that is smaller than twist constant $K_2$.

4. The electrooptic device of claim 1 wherein the mixture further includes at least one liquid crystal material that is not a dimeric liquid crystal material.

5. The electrooptic device of claim 1 wherein the spectral range of interest is the visible spectrum or a portion of the visible spectrum.

6. The electrooptic device of claim 1 wherein:
   the electrodes have an in-plane geometry generating an electric field parallel with the substrates, and
   the liquid crystal material within the operational range of electric field applied by the electrodes exhibits the $N^*_{oh}$ state with the oblique angle helicoid director whose helicoid axis is oriented parallel with the substrates and whose helicoid pitch is sized to provide diffraction of light in the spectral range of interest impinging on one of the substrates of the liquid crystal cell.

7. The electrooptic device of claim 1 wherein:
   the electrodes have a top-down geometry generating an electric field across the gap between the two spaced apart substrates, and
   the liquid crystal material within the operational range of electric field applied by the electrodes exhibits the $N^*_{oh}$ state with the oblique angle helicoid director whose helicoid axis is oriented transverse to the substrate and whose helicoid pitch is sized to provide Bragg reflection of light in the spectral range of interest impinging on one of the substrates of the liquid crystal cell.

8. The electrooptic device of claim 1 wherein:
   the liquid crystal material within a lower non-operational range of electric field applied by the electrodes exhibits a chiral nematic (N*) state whose director has a right angle helix with its helical axis oriented transverse to the electric field;
   wherein the lower non-operational range of electric field is lower than the operational range of electric field.

9. The electrooptic device of claim 8 wherein:
   the liquid crystal within a higher non-operational range of electric field applied by the electrodes exhibits a homeotropic state whose director is oriented parallel with the electric field;
   wherein the higher non-operational range of electric field is higher than the operational range of electric field.

10. A liquid crystal device comprising:
    a liquid crystal (LC) cell including two substrates, a cholesteric liquid crystal material disposed within the liquid crystal cell between the substrates, and
    two electrodes, the electrodes disposed on the substrates and configured to apply an electric field through the cholesteric liquid crystal material disposed within the liquid crystal cell, wherein the cholesteric liquid crystal material includes a mixture of at least two dimeric liquid crystal materials including at least one of:
1-(4-cyanobiphenyl-4'-yl)-6-(4-cyanobiphenyl-4'-yloxy)hexane (CB6OCB),
α,ω-bis(4,4-cyanobiphenyl)nonane (CB9CB), and
1",7"-bis(4-cyanobiphenyl-4'-yl)heptane (NC(C6H4)2(CH2)7(C6H4)2CN (CB7CB); and
a power generator for generating the applied electric field, the power generator configured to vary the strength of the applied electric field to produce diffracted or reflected light from the cholesteric liquid crystal material within the visible spectrum;
wherein the applied electric field induces the cholesteric liquid crystal material into a heliconical state including an oblique helicoid director.

11. The liquid crystal device according to claim 10, wherein the cholesteric liquid crystal material further includes between 1 and 5 wt % of chiral dopant.

12. The liquid crystal device according to claim 10, wherein the cholesteric liquid material further includes at least one liquid crystal material that is not a dimeric liquid crystal material.

13. The liquid crystal device according to claim 12, wherein the at least one liquid crystal material that is not a dimeric liquid crystal material comprises pentylcyanobiphenyle (5CB).

14. The liquid crystal device according to claim 10, wherein the cholesteric liquid crystal material includes a eutectic mixture of the at least two dimeric liquid crystal materials.

15. The liquid crystal device according to claim 10, wherein:
the electrodes have an in-plane geometry generating an applied electric field in the plane of the substrates, and
the applied electric field in the plane of the substrates induces the cholesteric liquid crystal material into the heliconical state including the oblique helicoid director whose helicoid axis is oriented in the plane of the substrates whereby the liquid crystal device diffracts light from the cholesteric liquid crystal material within the visible spectrum.

16. The liquid crystal device according to claim 10, wherein:
the electrodes have a vertical geometry generating an applied electric field normal to the plane of the substrates, and
the applied electric field normal to the plane of the substrates induces the cholesteric liquid crystal material into the heliconical state including the oblique helicoid director whose helicoid axis is oriented normal to the plane of the substrates whereby the liquid crystal device reflects light from the cholesteric liquid crystal material within the visible spectrum.

17. The liquid crystal device according to claim 10, wherein the applied electric field induces the cholesteric liquid crystal material into the heliconical state including the oblique helicoid director with a helicoid pitch effective to cause the reflected light to have a wavelength between approximately 400 nm and 700 nm.

18. A method of operating an electro-optic cholesteric liquid crystal device, the method comprising:
providing cholesteric liquid crystal material comprising a mixture including 1-(4-cyanobiphenyl-4'-yl)-6-(4-cyanobiphenyl-4'-yloxy)hexane (CB6OCB) or α,ω-bis(4,4-cyanobiphenyl)nonane (CB9CB) dimeric liquid crystal material and a second dimeric liquid crystal material;
applying an electric field to the cholestric liquid crystal material that is effective to induce a heliconical state in which the director forms an oblique helicoid;
while applying the electric field, diffracting or reflecting light of a wavelength selected by the applied electric field from the cholesteric liquid crystal material; and
adjusting the electric field to adjust the wavelength of light that is diffracted or reflected from the cholesteric liquid crystal material.

19. The method according to claim 18, wherein the second dimeric liquid crystal material comprises CB7CB dimeric liquid crystal material.

20. The method according to claim 19, wherein the mixture includes one of:
(i) a eutectic mixture of CB6OCB and CB7CB dimeric liquid crystal materials or
(ii) a eutectic mixture of CB9CB and CB7CB dimeric liquid crystal materials.

21. The method according to claim 18, wherein the mixture further includes at least one liquid crystal material that is not a dimeric liquid crystal material.

22. The method according to claim 19, wherein the mixture further includes a chiral dopant.

23. The method according to claim 19, wherein the applying, diffracting or reflecting, and adjusting operations are performed with the cholesteric liquid crystal material in the temperature range 20° C. to 30° C. inclusive.

* * * * *

UNITED STATES PATENT AND TRADEMARK OFFICE
CERTIFICATE OF CORRECTION

PATENT NO. : 9,732,277 B2
APPLICATION NO. : 15/053643
DATED : August 15, 2017
INVENTOR(S) : Oleg D. Lavrentovich et al.

It is certified that error appears in the above-identified patent and that said Letters Patent is hereby corrected as shown below:

On the Title Page

Item (72) replace:
Inventors: Oleg D. Lavrentovich, Kent, OH (US);
Jie V. Xiang, Kent, OH (US)
Sergij V. Shiyanovskii, Stow, OH (US)
Corrie T. Imrie, Aberdeen (GB)
Daniel A. Paterson, Aberdeen (GB)
John M. Storey, Aberdeen (GB)

With:
Inventors: Oleg D. Lavrentovich, Kent, OH (US);
Jie Xiang, Kent, OH (US)
Sergij V. Shiyanovskii, Stow, OH (US)
Corrie T. Imrie, Aberdeen (GB)
Daniel A. Paterson, Aberdeen (GB)
John M. Storey, Aberdeen (GB)

Signed and Sealed this
Twenty-sixth Day of June, 2018

Andrei Iancu
*Director of the United States Patent and Trademark Office*